RE 25140
Sept. 29, 1959   R. K. GALLOWAY   2,906,392
MACHINE FOR INSERTING ARTICLES INTO CARTONS
Filed April 30, 1956   20 Sheets-Sheet 1
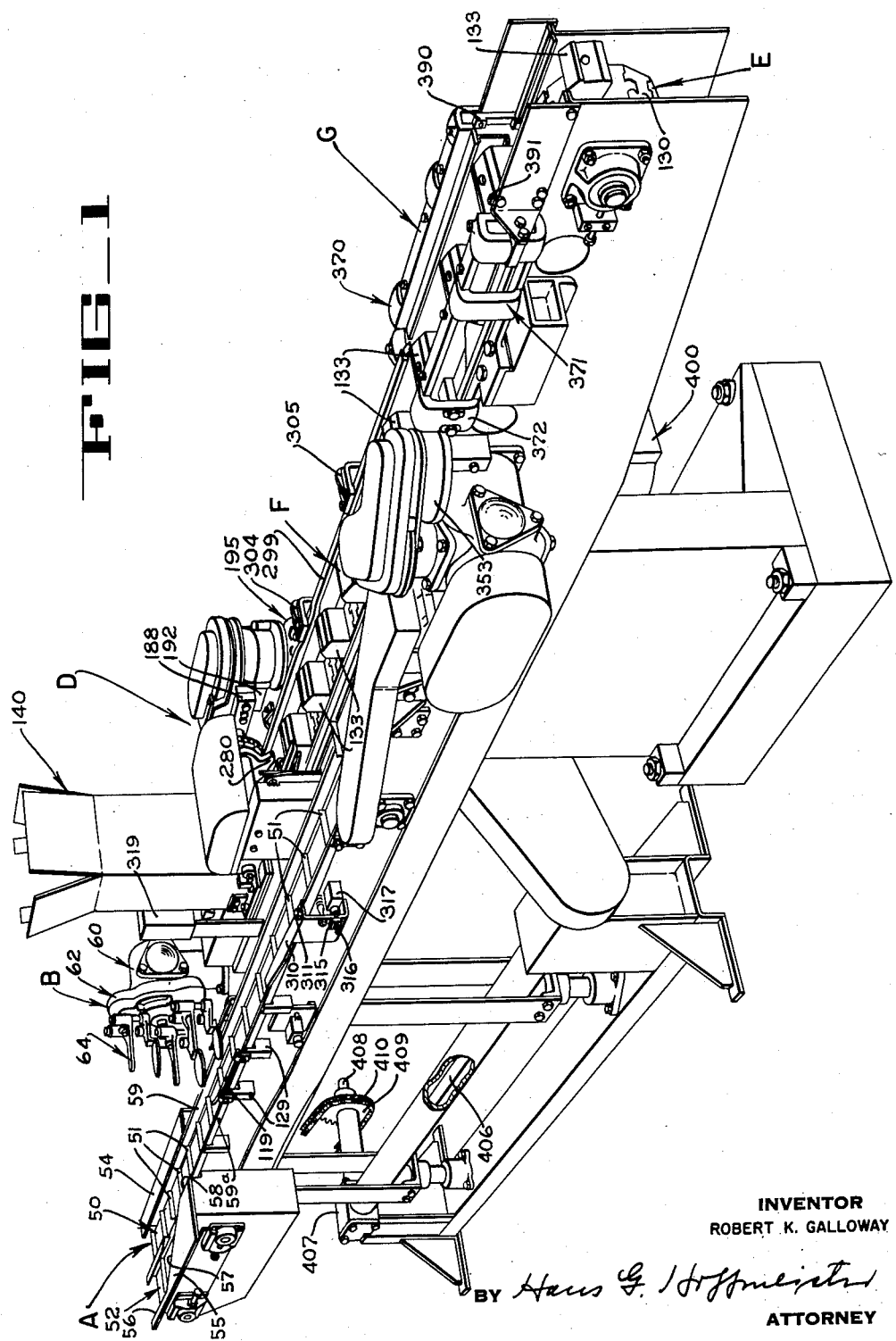
INVENTOR
ROBERT K. GALLOWAY
BY Hans G. Hoffmeister
ATTORNEY

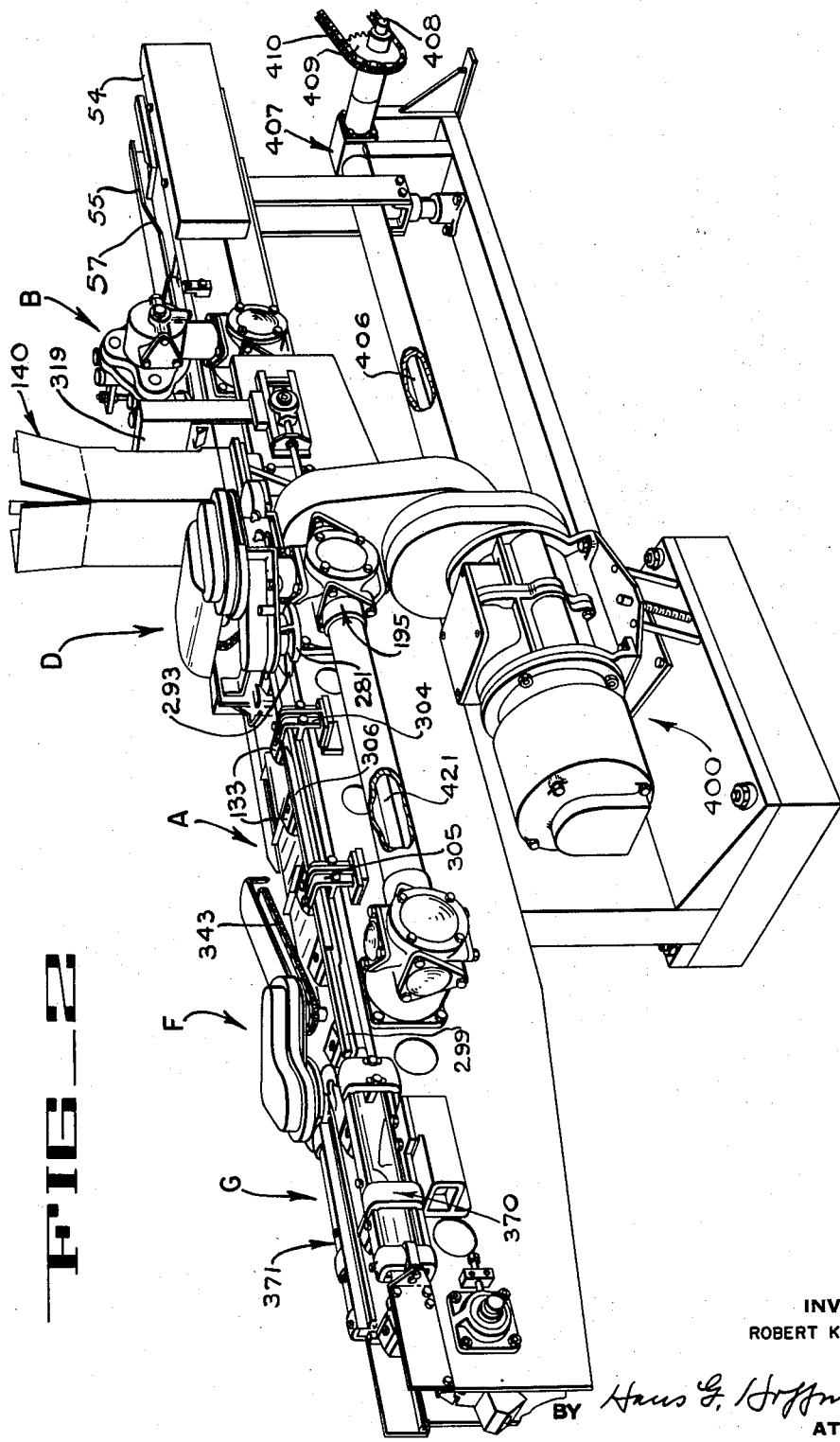

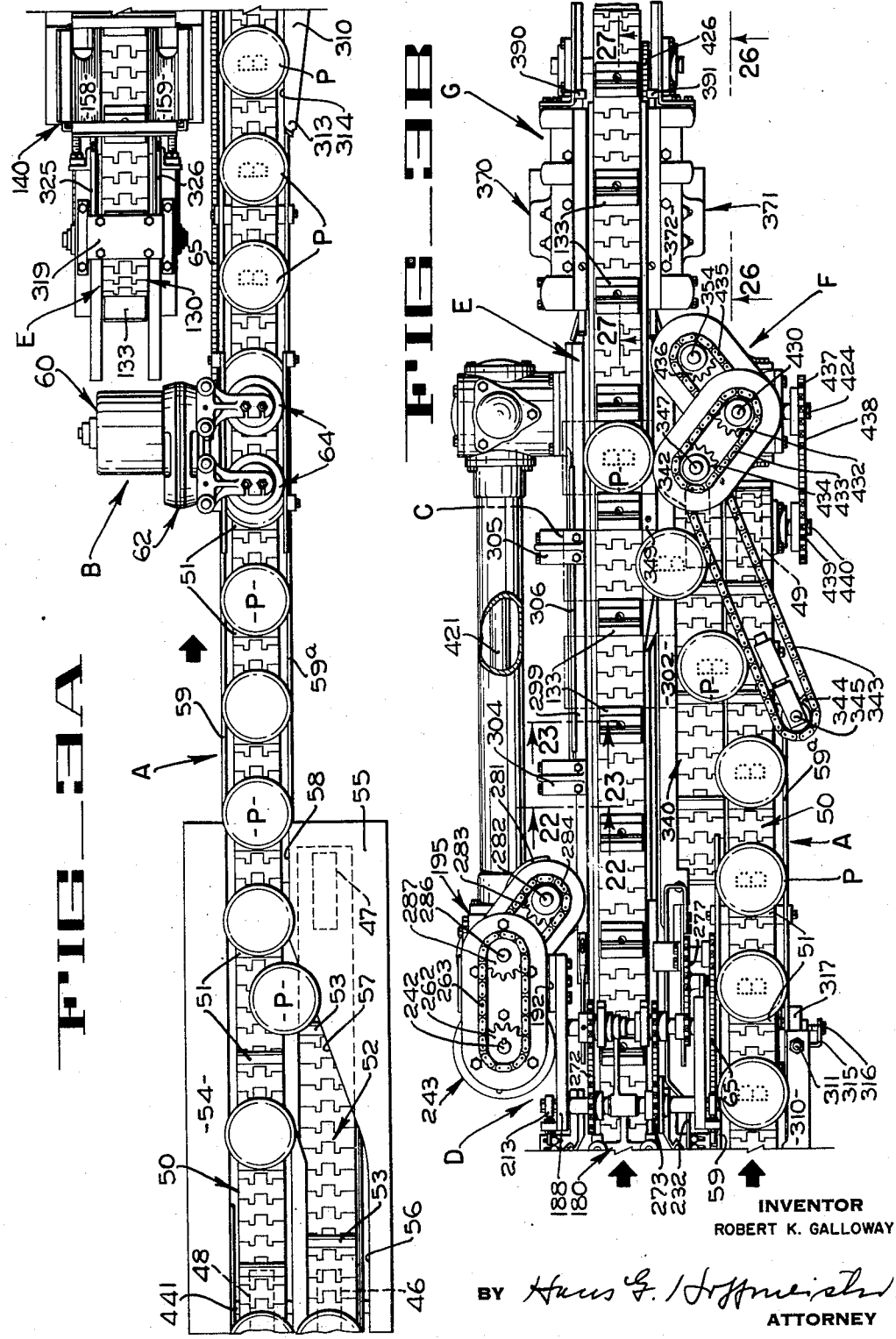

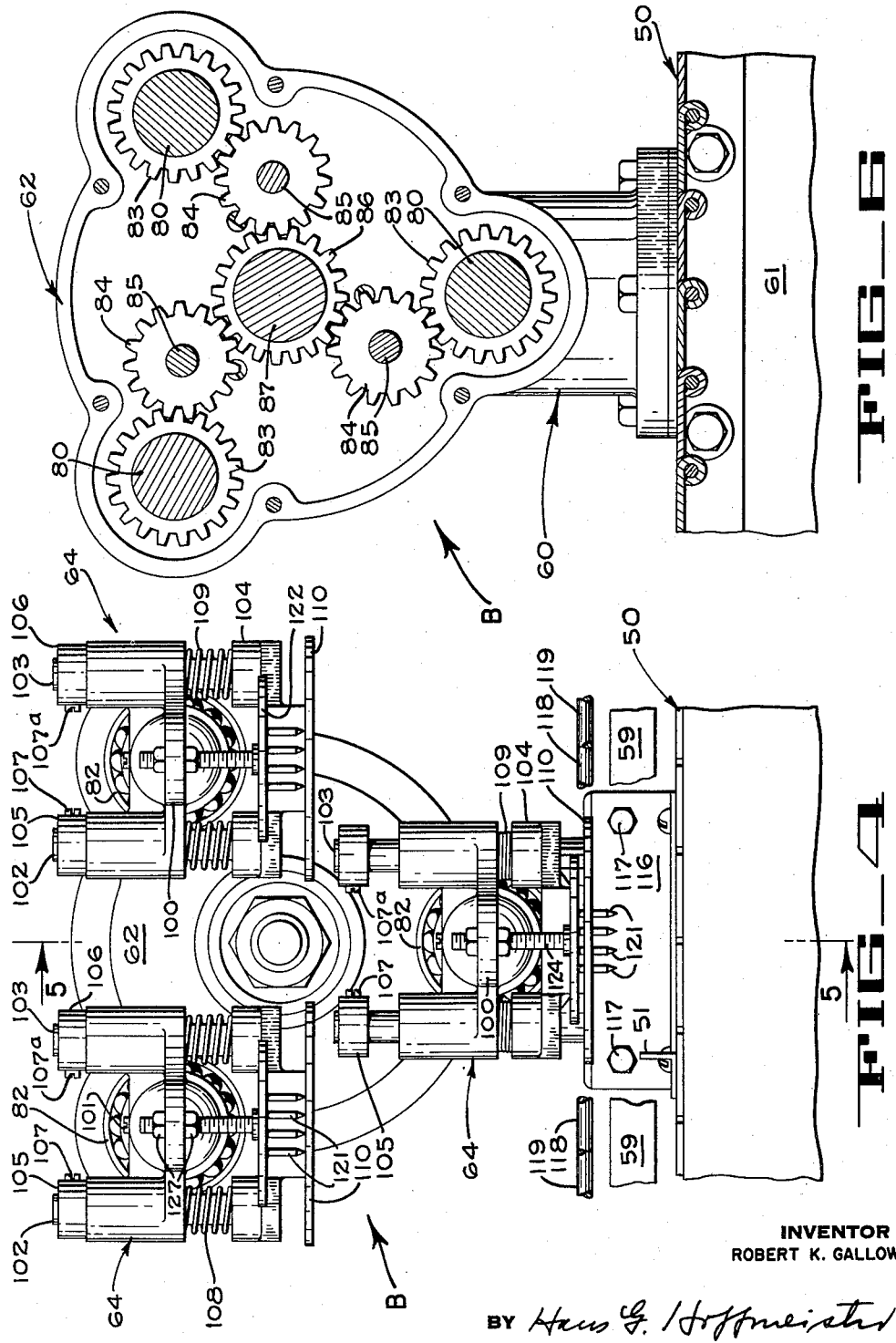

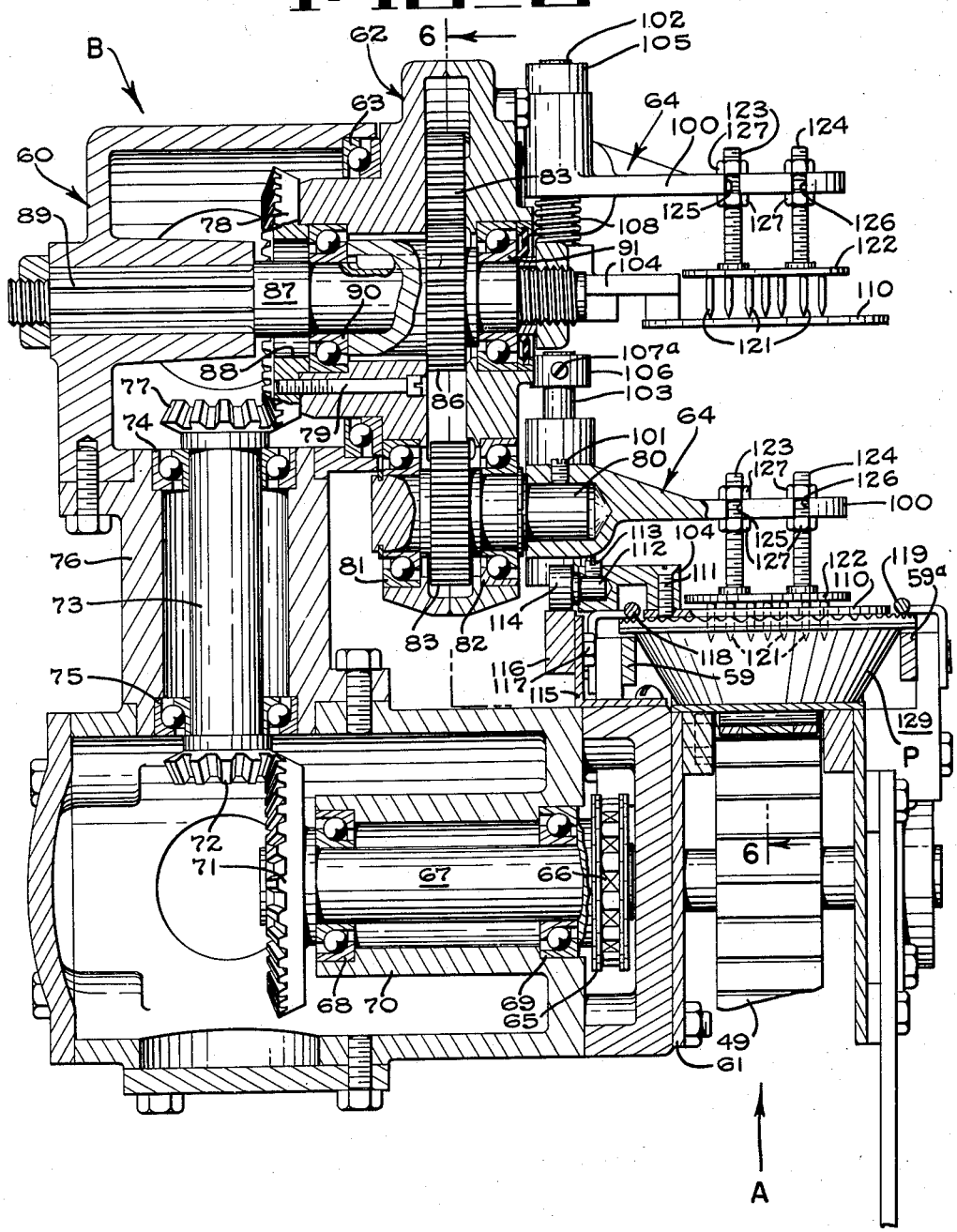

Sept. 29, 1959     R. K. GALLOWAY     2,906,392
MACHINE FOR INSERTING ARTICLES INTO CARTONS
Filed April 30, 1956     20 Sheets-Sheet 6
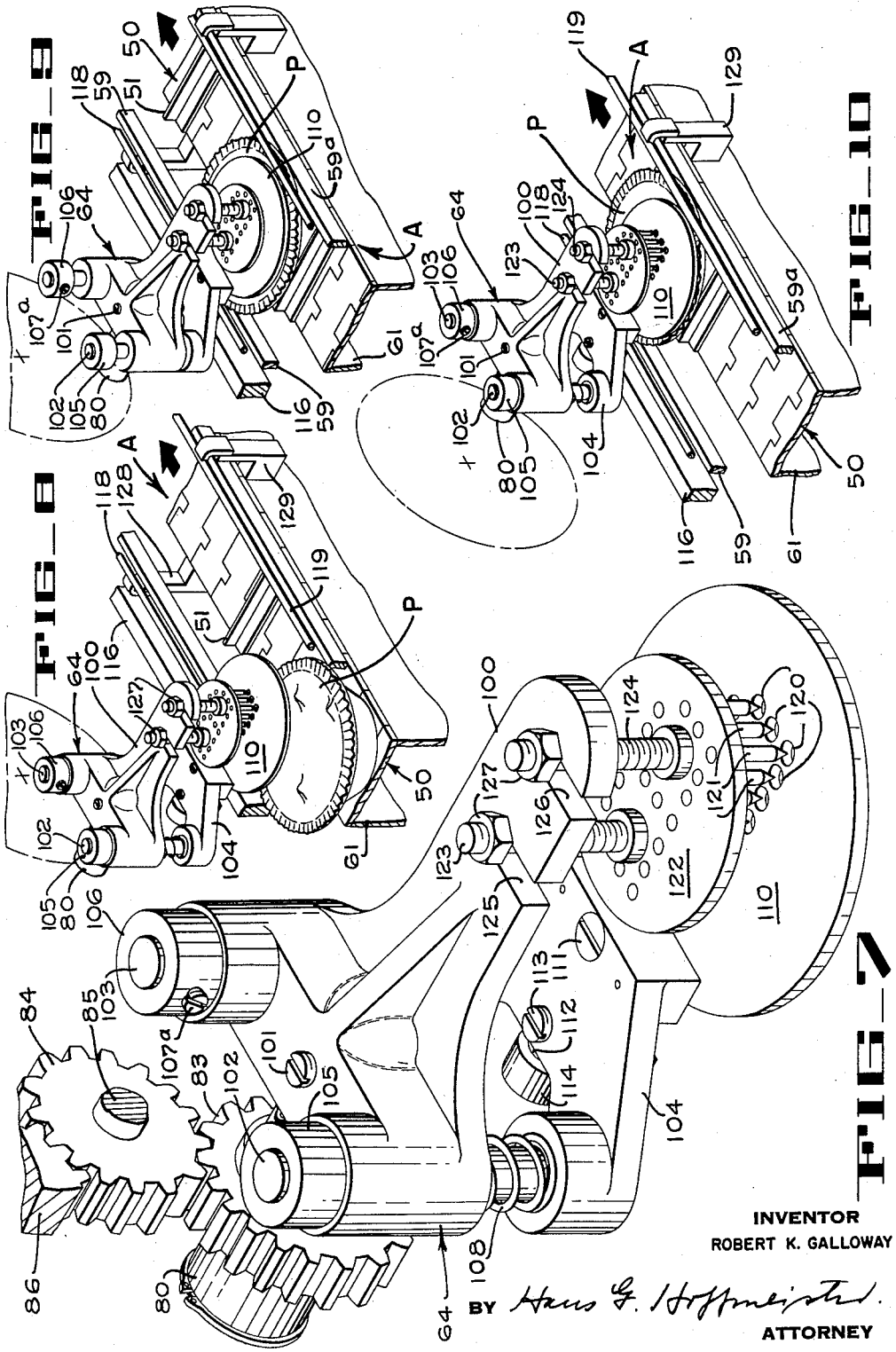

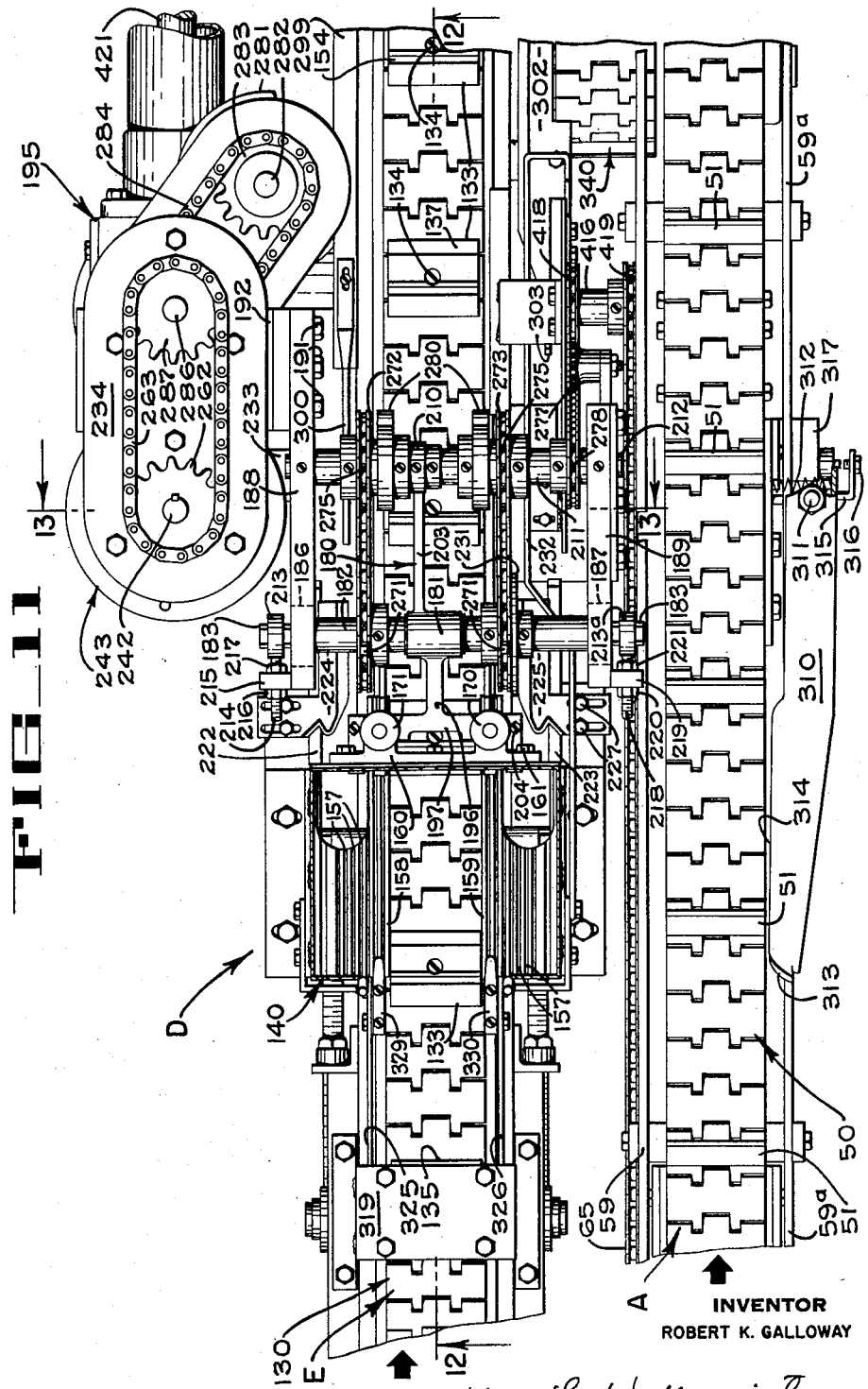

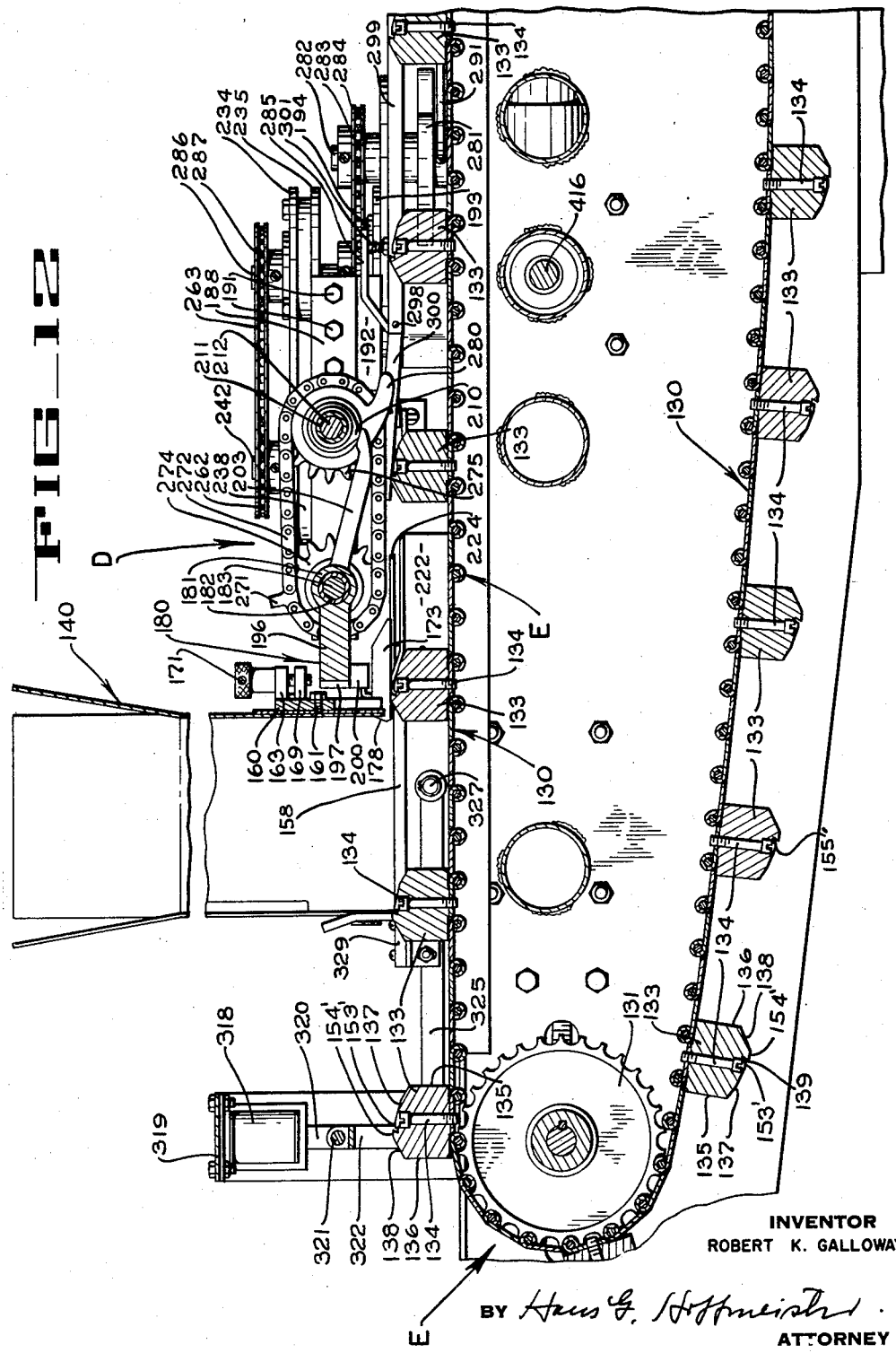

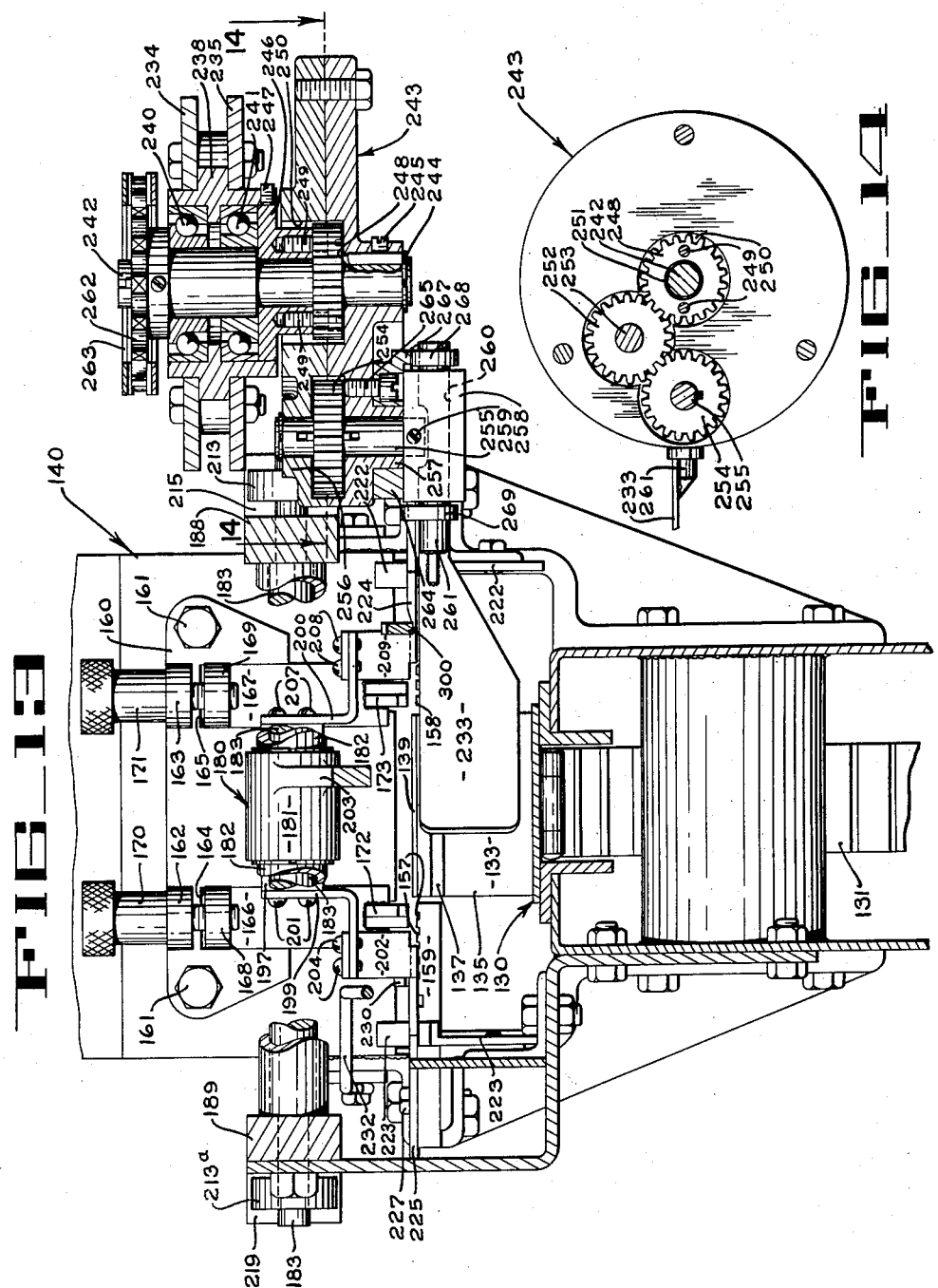

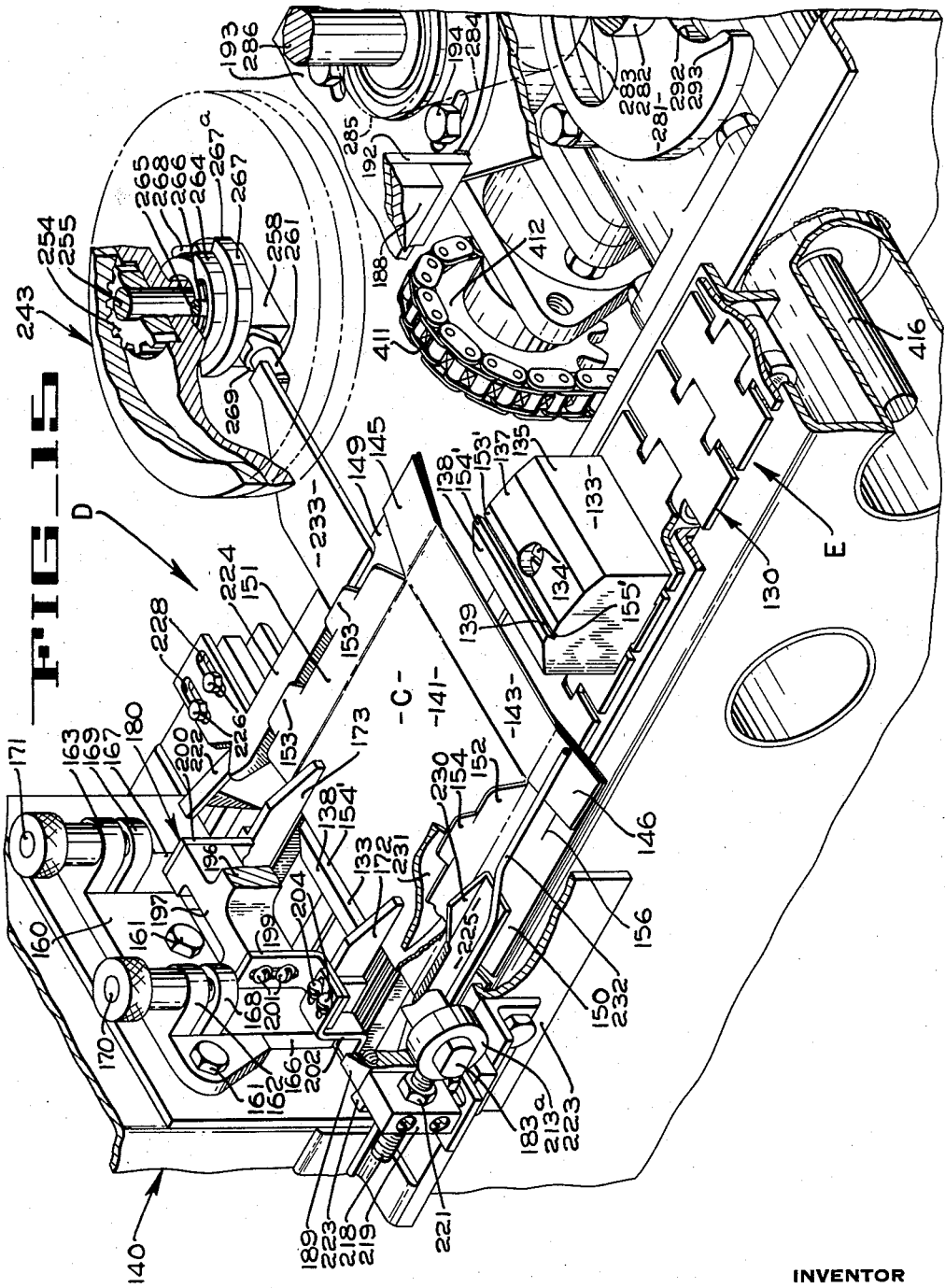

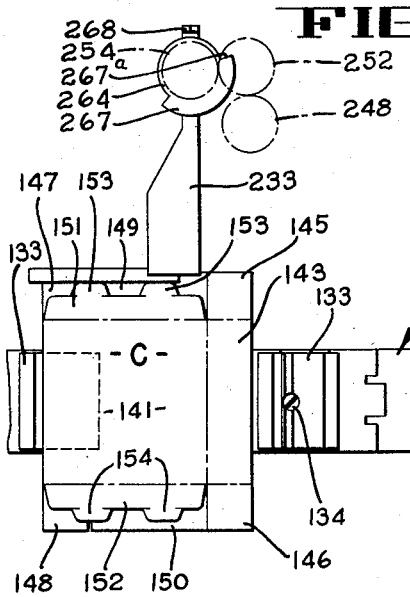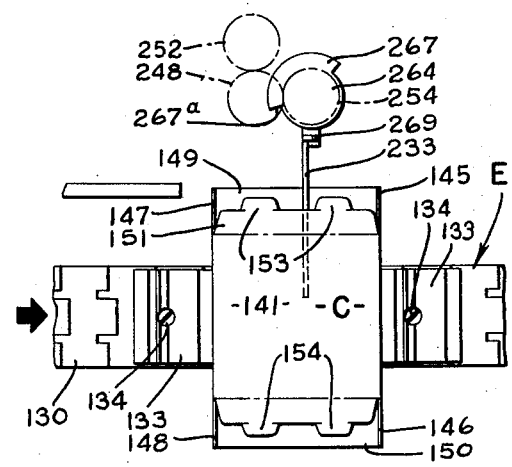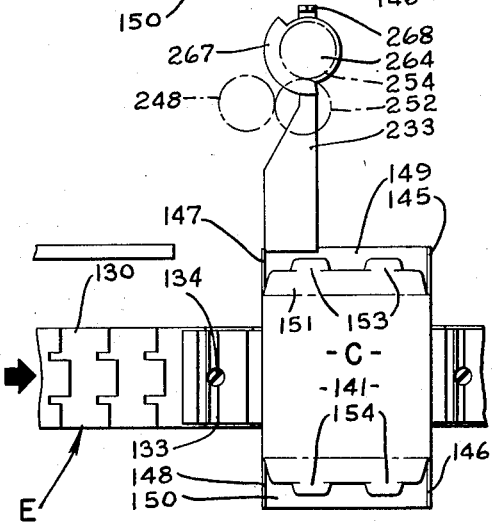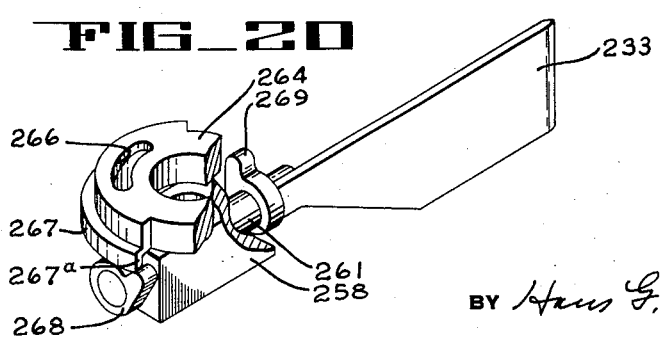

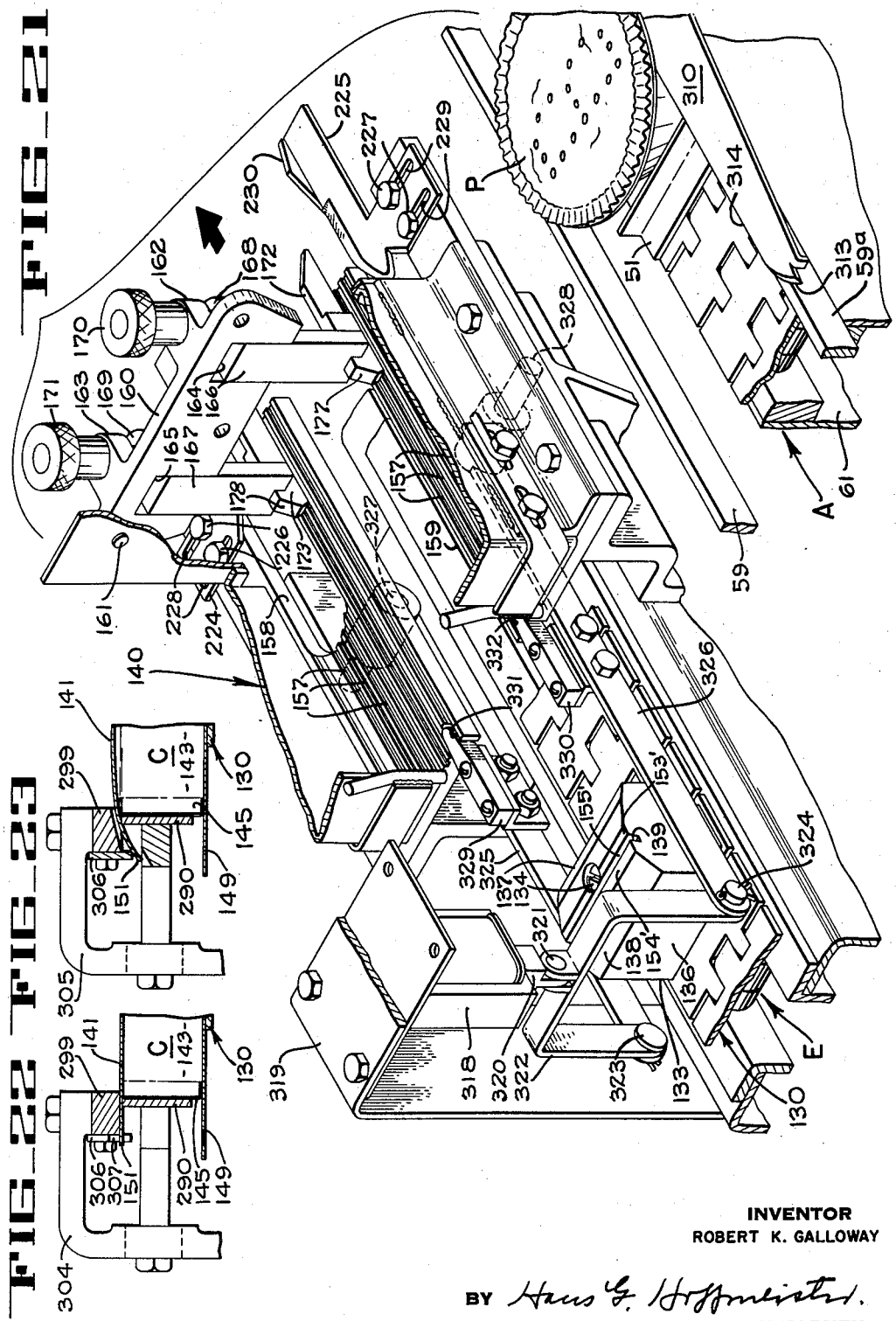

Sept. 29, 1959 R. K. GALLOWAY 2,906,392
MACHINE FOR INSERTING ARTICLES INTO CARTONS
Filed April 30, 1956 20 Sheets-Sheet 13
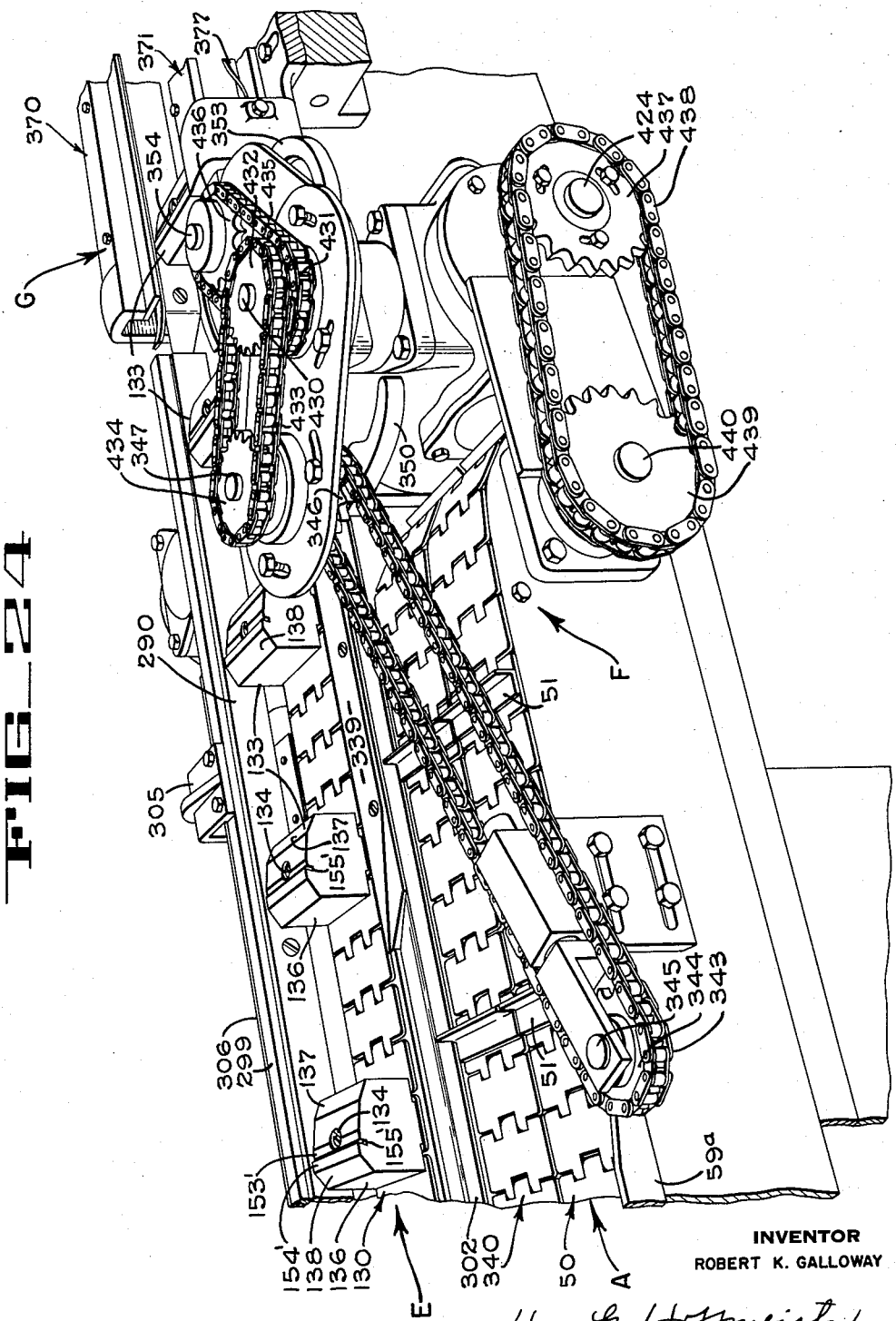
FIG_24
INVENTOR
ROBERT K. GALLOWAY
BY Hans G. Hoffmeister.
ATTORNEY

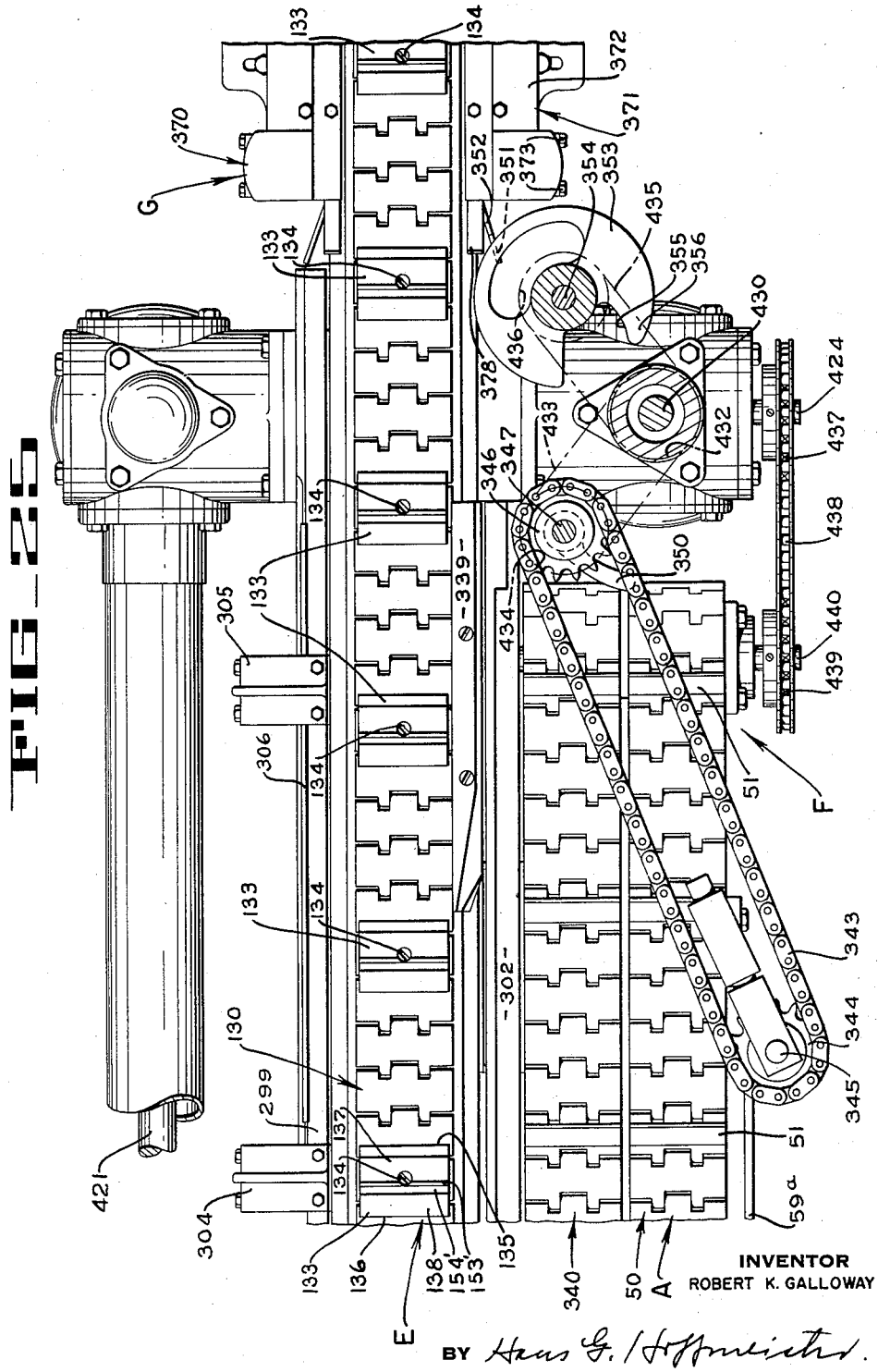

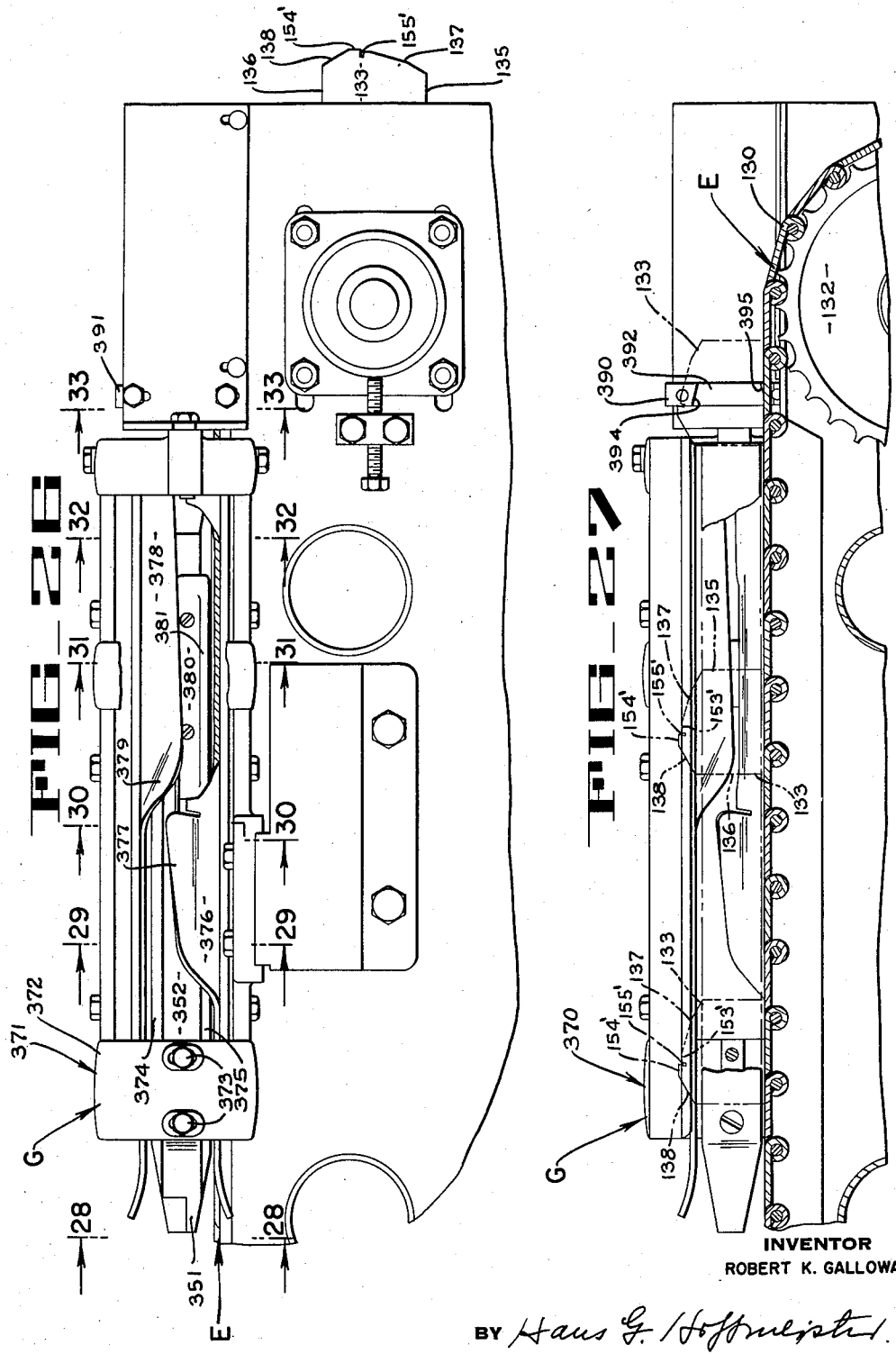

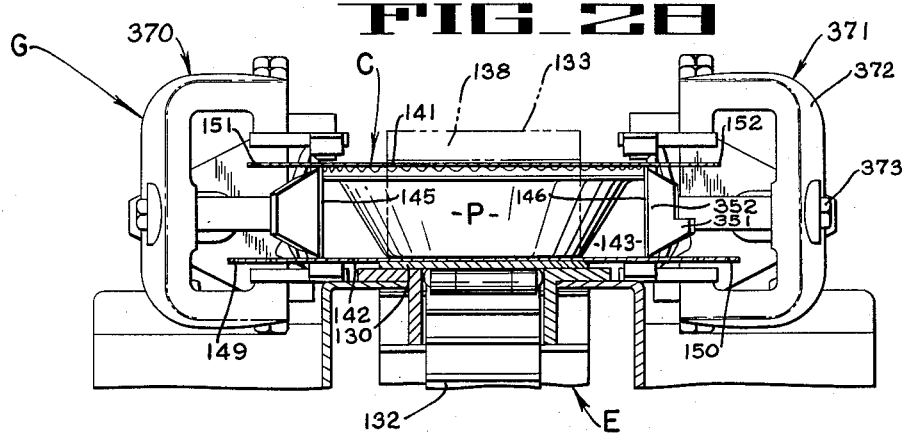
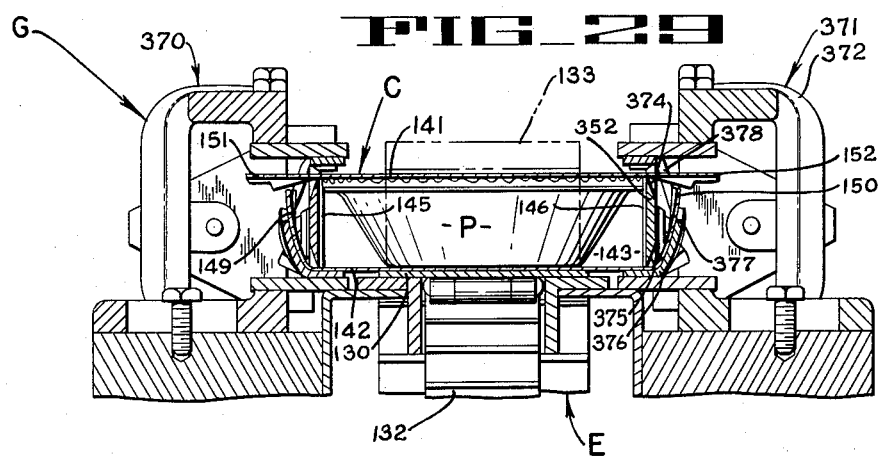
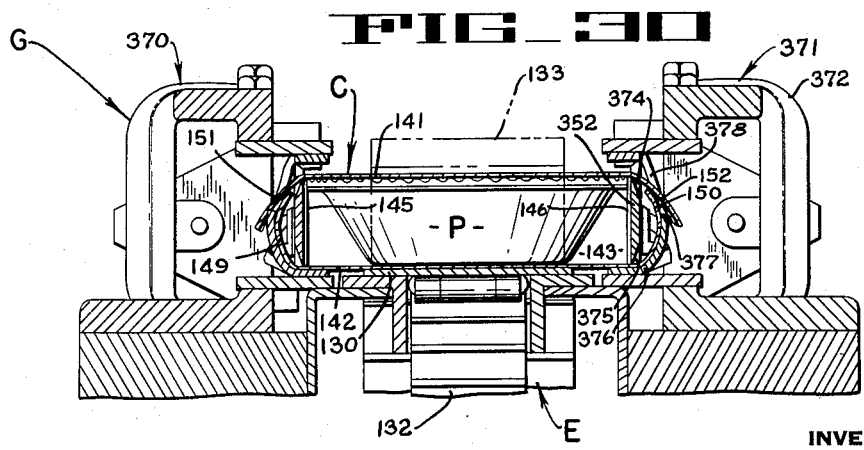

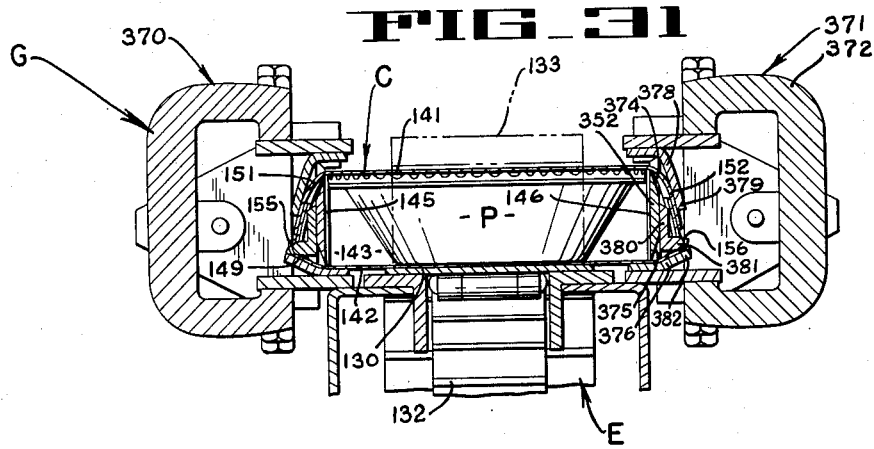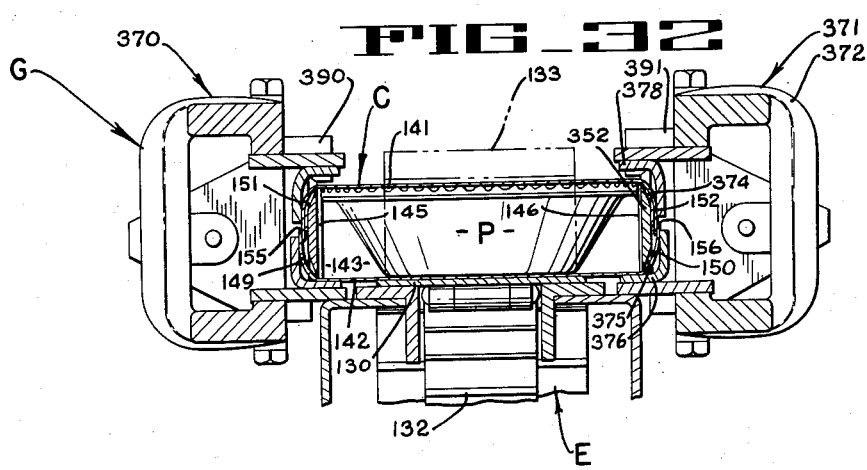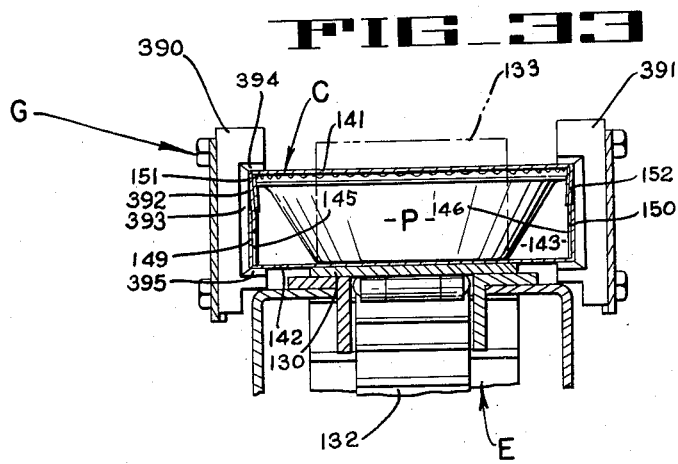

Sept. 29, 1959 R. K. GALLOWAY 2,906,392
MACHINE FOR INSERTING ARTICLES INTO CARTONS
Filed April 30, 1956 20 Sheets-Sheet 18
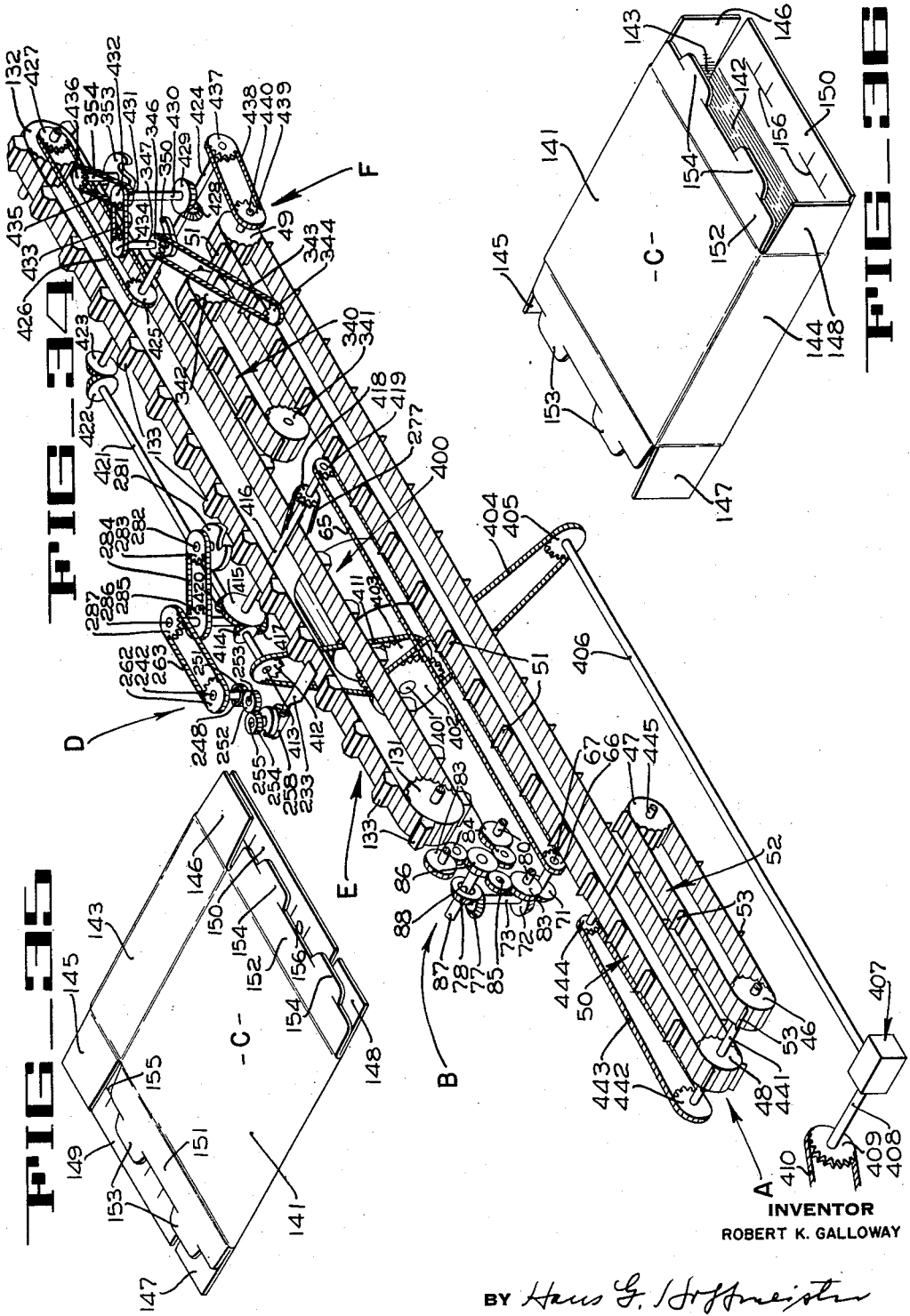
INVENTOR
ROBERT K. GALLOWAY
BY Hans G. Hoffmeister
ATTORNEY

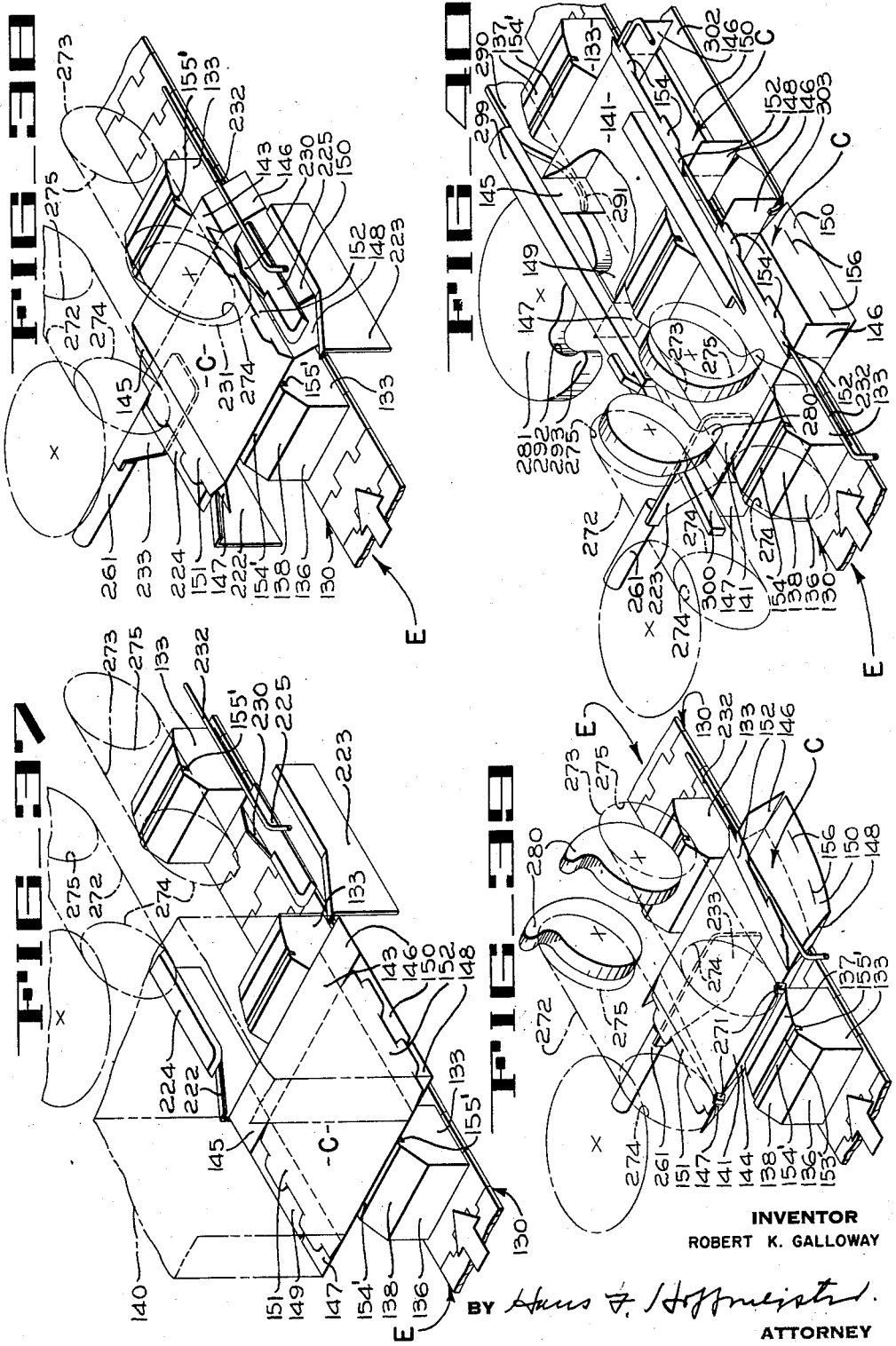

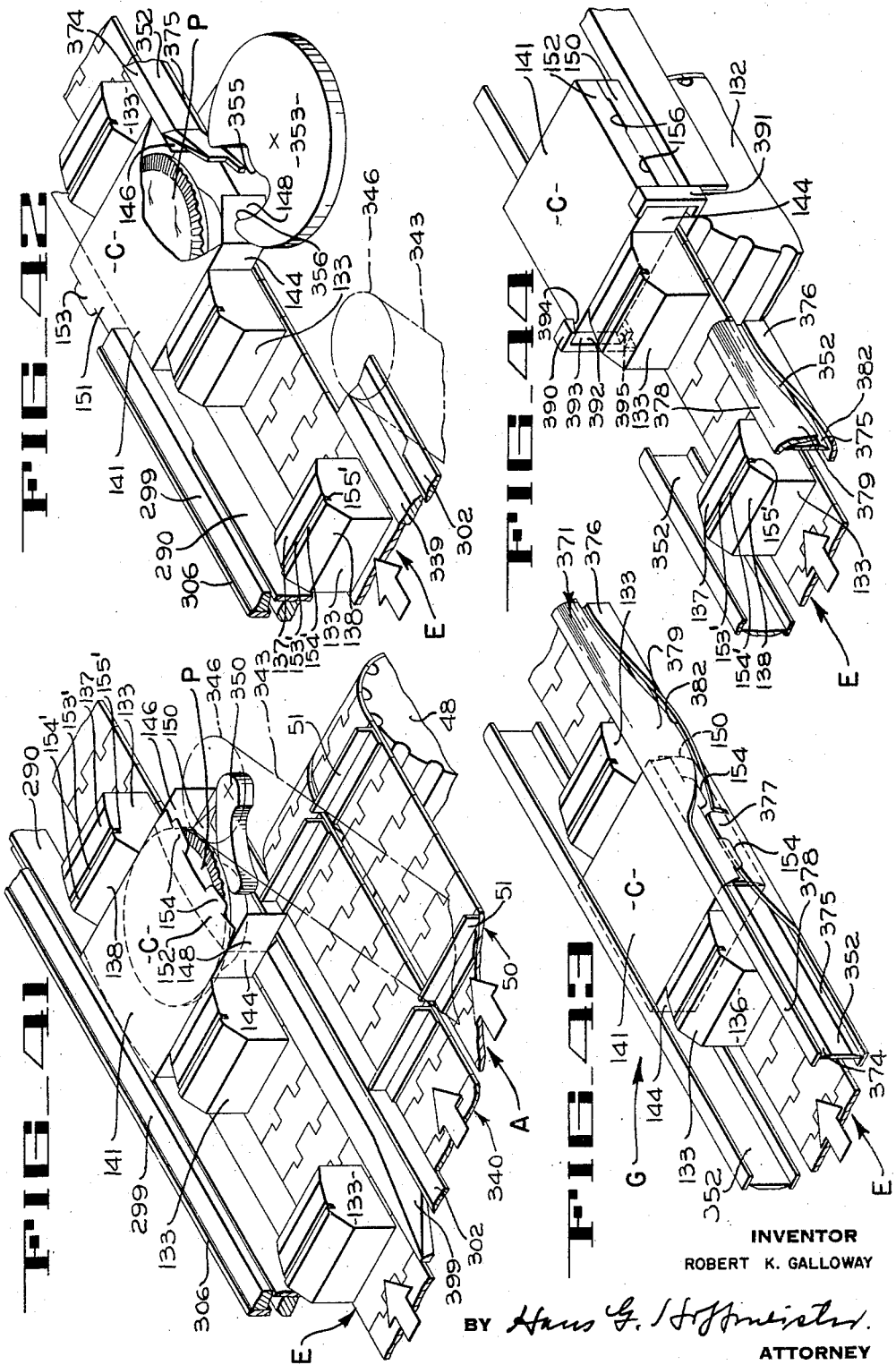

United States Patent Office 2,906,392
Patented Sept. 29, 1959

2,906,392

MACHINE FOR INSERTING ARTICLES INTO CARTONS

Robert K. Galloway, Hoopeston, Ill., assignor to Food Machinery and Chemical Corporation, San Jose, Calif., a corporation of Delaware Application April 30, 1956, Serial No. 581,402

4 Claims. (Cl. 198—32)

This invention relates to packaging machines, and particularly to a machine for erecting cartons, inserting an article therein and then closing the carton.

One object of the invention is to provide a novel high speed machine for erecting cartons, inserting articles therein, and closing the cartons.

Another object of the invention is to provide a high speed carton erecting device for use in a machine for cartoning articles such as pies or the like.

Another object is to provide an improved mechanism for tamping and perforating the pies prior to their insertion into the cartons.

Still another object of the invention is to provide a novel efficient mechanism for folding and locking the end flaps of a carton after a pie has been inserted therein.

A further object of the invention is to provide an efficient, high speed carton feed mechanism for feeding cartons one by one to a carton erecting mechanism.

Other objects and advantages will be more fully apparent from the following description taken in conjunction with the accompanying drawings in which:

Fig. 1 is a perspective of a pie cartoning machine embodying the principles of the invention, looking from the delivery end thereof toward the loading end, and particularly showing the side of the machine which will be referred to as the right side.

Fig. 2 is a similar perspective of the left side of the machine shown in Fig. 1.

Figs. 3A and 3B are fragmentary plans which, when assembled end to end, together form a plan of the machine shown in Figs. 1 and 2.

Fig. 4 is a front elevation of the pie tamping and perforating mechanism used in the present machine.

Fig. 5 is a vertical section of the tamping and perforating mechanism taken on line 5—5 of Fig. 4.

Fig. 6 is a vertical section taken on line 6—6 of Fig. 5, illustrating the planetary gearing for the tamping mechanisms.

Fig. 7 is a perspective of one of the tamping and perforating units.

Figs. 8, 9 and 10 are schematic views showing the action of one of the tamping and perforating units in coaction with a pie on the pie conveyor.

Fig. 11 is a partial plan illustrating the carton feeding and erecting mechanism.

Fig. 12 is a fragmentary central vertical section through the carton erecting mechanism taken on line 12—12 of Fig. 11.

Fig. 13 is a transverse vertical section, with parts broken away, taken on line 13—13 of Fig. 11 and illustrating the mounting of the carton erecting blade.

Fig. 14 is a horizontal section taken on line 14—14 of Fig. 13 and illustrates the planetary gearing for the carton erecting blade.

Fig. 15 is a perspective, with parts broken away and parts in section, of a portion of the carton erecting mechanism.

Figs. 16 to 19 are schematic views illustrating the action of the carton erecting blade illustrated in Fig. 15.

Fig. 20 is a perspective of the carton erecting blade showing the two cam followers mounted thereon and a portion of the actuating cam.

Fig. 21 is a fragmentary perspective of the carton magazine and the mechanism for preventing feed of a carton if no pie is present on the corresponding section of the pie conveyor.

Fig. 22 is a fragmentary transverse vertical section taken along line 22—22 of Fig. 3B.

Fig. 23 is a similar fragmentary section taken along line 23—23 of Fig. 3B.

Fig. 24 is a fragmentary perspective, particularly illustrating the pie inserting mechanism.

Fig. 25 is a plan of the pie inserting mechanism of Fig. 24.

Fig. 26 is a side elevation, with parts broken away, of the end flap folding and locking mechanism, looking in the direction of the arrows 26—26 of Fig. 3B.

Fig. 27 is a central longitudinal section of the end flap folding and locking mechanism taken on line 27—27 of Fig. 3B.

Figs. 28 to 33 are transverse vertical sections taken respectively at progressive points along the path of movement of a carton through the folding and locking mechanism, on lines 28—28 to 33—33, respectively, of Fig. 26.

Fig. 34 is a schematic view illustrating the mechanisms for driving the various operating members of the machine.

Figs. 35 and 36 are perspectives of the pie cartons in collapsed and open positions, respectively.

Figs. 37 to 44 are schematic perspectives illustrating the various operations performed in erecting a carton, inserting a pie therein, and closing the carton.

*General description*

Referring now to the drawings and particularly to Figs. 1 and 2 thereof, the device generally comprises a pie conveyor A adapted to receive pies from a pie making machine (not shown) and convey the pies past a pie tamping and perforating machine B to a pie inserting station F. A carton erecting mechanism D is adapted to erect cartons from a flattened condition to an open and erect condition on a carton conveyor E, disposed parallel to and operating in timed relation with the pie conveyor A. The pie inserting mechanism F is adapted to transfer the pies from the pie conveyor A to the open cartons C on the carton conveyor E, and thereafter the carton conveyor conducts the cartons C through a carton closing and locking mechanism G.

For purposes of description, the pie receiving end of the machine will hereinafter be referred to as the rear end of the machine, the pie discharge end as the forward end, and the sides will be designated as right and left sides to correspond to the right and left sides of a person standing at the rear end looking toward the discharge end of the machine.

Referring now particularly to Figs. 3A and 3B the pie conveying mechanism A comprises an endless conveyor belt 50 trained around sprocket-like drums 48 and 49 rotatably mounted one adjacent each end of the machine frame. The belt is made up of a plurality of complementary metal plates forming a flat support surface and having a plurality of upstanding flights or pushers 51 at regularly spaced intervals therealong. Mounted adjacent the pie conveyor 50 is a second endless conveyor belt 52 trained around a pair of sprocket-like drums 46 and 47 and similarly provided with upstanding flights or pusher members 53. The flights 53 of the secondary conveyor belt 52 are spaced from each other a distance equal to twice the distance between the flights 51 on the conveyor 50. The conveyor belt 52 is driven by suitable mechanism, hereinafter described, at a linear speed which is twice as fast as the linear speed of the conveyor belt 50. A guide plate 54 is located adjacent the left side of the conveyor 50 and is adapted to guide the left side of the pies being conveyed thereon. A second guide plate 55 is mounted adjacent the right side of the conveyor belt 52 and is provided with a relatively straight inner edge portion 56 which extends parallel to the conveyor belt 52, an inclined edge portion 57 which extends diagonally across the line of travel of the conveyor belt 52, and a terminal edge portion 58 which extends parallel to the right side of the conveyor belt 50 in spaced relation with the inner edge of the guide plate 54, whereby it may be seen that pies travelling on the conveyor belt 52 are guided laterally by the inclined edge 57 and are transposed onto the conveyor belt 50.

In operation, two pies issuing side by side from the pie making machine (not shown) are picked up simultaneously by the flights 51 and 53 on the conveyor belts 50 and 52, respectively. Since the conveyor belt 52 is travelling at a greater speed than the conveyor 50, the pie which is picked up by the conveyor belt 52 moves ahead of the pie picked up at the same time by the conveyor belt 50 and is guided by the edge 57 into a position on the conveyor belt 50 in front of the pie thereon. In order to provide proper spacing to permit the pies from the auxiliary conveyor belt 52 to be interposed between the pies on the conveyor chain 50, the conveyor belts 50 and 52 are only supplied from the pie making machine with pies in front of alternate flights on each of the conveyor belts. A pair of guide rails 59 and 59a are mounted one adjacent each side of the conveyor belt 50 beyond the forward ends of the guide plates 54 and 55 to guide the pies P being conveyed thereon.

*Pie tamping and perforating mechanism*

The pie tamping and perforating mechanism generally indicated at B is best illustrated in Figs. 4 through 10, inclusively, and comprises a housing 60 mounted on a side plate 61 (Fig. 5) which is part of the frame mechanism supporting the pie conveyor A. Mounted on the housing 60, for rotation with respect thereto about an axis extending transversely above the conveyor A, is a rotating planetary gear housing 62 mounted in suitable bearings 63 within the upper portion of the housing 60. The rotating planetary housing 62 rotatably carries three tamping and perforating mechanisms generally indicated at 64. The planetary housing 62 is rotated through a drive mechanism comprising a drive chain 65, driven in a suitable manner hereinbelow described, which drives a sprocket 66 fixed to a horizontal shaft 67 mounted in suitable bearings 68 and 69 within an internal boss 70 in the housing 60. A bevel gear 71 is fixed to the inner end of the shaft 67 and meshes with a companion bevel gear 72 fixed to the lower end of a vertical shaft 73 rotatably mounted in suitable bearings 74 and 75 in a vertical portion 76 of the housing 60. A bevel gear 77 is fixed to the upper end of the shaft 73 and meshes with a companion bevel gear 78 fixed to the rotating planetary housing 62 by a plurality of studs such as indicated at 79. Accordingly, when the shaft 67 is driven by chain 65, the housing 62 will rotate about the axis of bevel gear 78.

Each of the tamping and perforating mechanisms 64 is mounted on the outer end of a stub shaft 80 which is rotatably carried by bearings 81 and 82 mounted in the rotating planetary housing 62. As best seen in Fig. 6, a planet gear 83 is fixed to each stub shaft 80 and meshes with an idler gear 84 rotatably mounted on a stub shaft 85 fixed to the planetary housing 62. The idler gear 84 meshes with a sun gear 86 fixed to a shaft 87 which extends through an axial opening 88 provided in the bevel gear 78 in the manner illustrated in Fig. 5. The rear end of the shaft 87 is splined to the housing 60 at 89. Suitable bearings 90 and 91 are interposed between the planetary housing 62 and the shaft 87 in order to maintain said shaft centralized with respect to said planetary housing. From the structure thus far described, it may be seen that since the sun gear 86 is stationary, and since the sun gear 86 and the planet gears 83 are the same size, when the housing 62 is rotated, each of the tamping and perforating mechanisms 64 is provided with orbital translatory movement about the axis of the shaft 87, and the tamping and perforating mechanisms remain in the same vertical orientation.

Turning now specifically to Figs. 5 and 7, the tamping and perforating mechanism 64 comprises an upper bracket 100 fixed to the outer end of the shaft 80 by a set screw 101. The bracket 100 is provided with two parallel vertically extending bores (not shown) adapted to slidably receive a pair of pins 102 and 103 which extend upwardly from and are fixed to a lower bracket member 104. A pair of collars 105 and 106 are adjustably secured to the upper ends of the pins 102 and 103, respectively, by set screws 107 and 107a on the collars 105 and 106, respectively. A pair of springs 108 and 109 surround the pins 102 and 103, respectively, between the lower surface of the upper bracket 100 and the upper surface of the lower bracket 104 and normally urge the lower bracket 104 downwardly relative to the upper bracket 100. A tamping plate 110 (Fig. 7) is fixed to the undersurface of the bracket 104 by a suitable machine screw in the manner indicated at 111. A stub shaft 112 (Fig. 5) is fixed to the bracket 104 by a set screw 113 and extends rearwardly from said bracket and rotatably supports a roller 114. An angle bracket 115 is fixed to the housing 60 with one flange thereof extending upwardly adjacent the pie conveyor A and a guide block 116 is adjustably secured to said upwardly extending flange by studs 117 extending through suitable vertically disposed slots (not shown) in said flange and threaded into said block. The roller 114 is adapted to strike the upper surface of the block 116 to limit the downward travel of the tamping plate 110.

As best seen in Fig. 7, the tamping plate 110 is provided with a plurality of apertures 120 arranged in any desired relationship with each other, for example, in the particular embodiment set forth herein, the apertures 120 are arranged in the form of the letter B. The arrangement may be in the form to indicate the type of pie, for example T for turkey, C for chicken, or it may be an initial indicating the maker of the pie. A plurality of perforating members 121, equal in number to and arranged in the same pattern as the apertures 120, are fixed to a circular plate 122. The plate 122 is disposed above the plate 110 and is provided with two upstanding studs 123 and 124 which extend upwardly through suitable slots 125 and 126, respectively, formed in the outer portion of the upper bracket 100. Suitable nuts 127 threadedly received on the studs 123 and 124, respectively, above and below the upper bracket 100 adjustably secure the plate 122, and the perforating members 121 fixed thereto, in proper spaced relation with said bracket.

The action of the perforating and tamping mechanisms 64 is best illustrated in Figs. 8 through 10. In Fig. 8, the relationship of the perforating and tamping mechanism with a pie P on the conveyor A is shown just before the pie tamping and perforating mechanism engages the pie P. In Fig. 9, the pie P has advanced to a position opposite the central vertical axis of the pie tamping and perforating station B, and the tamping and perforating mechanism 64 has moved downwardly with respect to the pie and forwardly in conjunction therewith. In this position, the tamping plate 110 is pressing downwardly on the upper surface of the pie P with a pressure controlled by the springs 108 and 109. The downward movement of the plate 110 is limited by the contact of the roller 114 with the upper surface of the guide block 116. The bracket 100 has moved downwardly relative to the bracket 104, and the perforating members 121 have consequently been projected through the apertures 120 in the tamping plate 100 to perforate the upper crust of the pie P. Fig. 10 illustrates the withdrawal of the perforating members 121 from the upper surface of the pie P, and it will be seen that the action of the springs 108 and 109 maintains the tamping plate 110 in contact with the upper surface of the pie P until the perforating members 121 have been completely withdrawn therefrom, whereby the tamping plate 110 serves both to strip from the perforating members 121 any dough which may tend to adhere thereto, and to prevent the raising of the upper crust of the pie P by the withdrawal of the perforating members 121. A pair of guide rods 118 and 119, mounted to the frame of the machine by suitable brackets 128 and 129, respectively, overlie the outer edges of the pies P adjacent the tamping mechanism B and prevent the pies being raised from the conveyor A by adherence of the upper crust to the tamping plate 110.

*Carton conveyor and carton feed mechanism*

As best seen in Figs. 11 and 12, the carton conveyor E comprises a conveyor belt 130 trained around a sprocket-like drum 131 (Fig. 12) and a similar drum 132 (Figs. 27 and 34) and is provided on its upper surface with a plurality of spaced blocks 133, each of which is affixed to the conveyor belt 130 by means of studs 134 in the manner indicated in Fig. 12. As best seen in Figs. 12 and 15, each of the blocks 133 is provided with vertical front and rear walls 135 and 136, respectively. The upper surface of each of the blocks is formed by an upwardly and rearwardly extending surface 137 and an upwardly and forwardly extending surface 138. The surface 137 terminates in a horizontal flat 153', and similarly the surface 138 terminates in a horizontal flat 154'. The plane of the flat 153' is below the plane of the flat 154' a distance substantially equal to the thickness of a carton in its flat folded relation. A groove 155' is formed in the upper surface of the block 133 between the flats 153' and 154' to collect any wax particles which might be dislodged from the cartons. The rear wall of the groove 155' constitutes a forwardly facing carton-engaging shoulder 139 on the upper portion of the block 133 adjacent to and spaced rearwardly from the central transverse axis of the block.

The carton erecting mechanism D comprises a vertically disposed rectangular magazine 140 (Fig. 12) mounted above the upper reach of the conveyor 130 and adapted to receive a stack of cartons C in their flattened condition such as illustrated in Fig. 35. As best seen in Figs. 35 and 36, the cartons C each comprise a top panel 141, a bottom panel 142, a front side panel 143, and a rear side panel 144. A pair of end flaps 145 and 146 extend laterally from the opposite side ends of the panel 143, and similarly, a pair of flaps 147 and 148 extend laterally from the side ends of the panel 144. Similarly, flaps 149 and 150 extend from the opposite ends of the bottom panel 142, and flaps 151 and 152 extend from the opposite ends of the top panel 141. The flaps 151 and 152 attached to the top panel 141 are shorter than the flaps 149 and 150 attached to the bottom panel 142 and the flaps 145, 146, 147 and 148 attached to the front and rear panels 143 and 144, and are provided with outwardly projecting tabs 153 and 154 adapted to be received within suitable slits 155 and 156 correspondingly located in the flaps 149 and 150, respectively.

Returning now to the carton feed mechanism as illustrated in Figs. 11, 12, 13, 15 and 21, the cartons C are placed in the magazine 140 (Fig. 12) with the crease line between the front panel 143 and the bottom panel 142 facing in the direction of travel of the carton conveyor E. The magazine 140 is provided with a pair of carton supporting plates 158 and 159 adjacent its lower end. The plates 158 and 159 are so located as to support the lowermost carton of the stack at a height whereby the rearmost end of the carton will be engaged by the shoulder 139 on one of the blocks 133 passing beneath the magazine 140 in order to strip the lowermost carton from the stack within the magazine and advance said carton with said conveyor E. The upper surface of the plates 158 and 159 are each provided with a plurality of longitudinally extending grooves 157 to collect any wax particles which may be dislodged from the cartons.

*Fixed carton-feed gate mechanism*

A fixed gate mechanism, best illustrated in Figs. 13 and 15, is provided adjacent the front wall of the magazine 140 to insure that only one carton may be removed therefrom at a time. The gate mechanism is adjustable and comprises a bracket 160 fixed to the forward face of the magazine 140 adjacent the lower end thereof by a plurality of cap screws as indicated at 161. The bracket 160 has formed integrally therewith a pair of forwardly extending ears 162 and 163 adjacent its upper edge. A pair of suitable grooves 164 and 165 (Fig. 13) are formed in the bracket immediately below the ears 162 and 163. Two L-shaped gate members 166 and 167 are slidably mounted in the grooves 164 and 165. Near its upper end, the member 166 is provided with an outwardly extending flange 168 in parallel relation with the ear 162 on the bracket 160, and similarly, the member 167 is provided with an outwardly extending flange 169 in parallel relation with the ear 163 on the bracket 160. An adjusting screw 170 extends through a suitable aperture in the ear 162 and is threadedly received in the flange 168 on the member 166, whereby rotation of the screw 170 will adjust the lower end of the member 166 with respect to the bottom plate 159 within the magazine 140. A similar adjusting screw 171 is similarly connected to the flange 169 and effects a similar adjustment of the member 167 with respect to the plate 158 within the magazine 140. The lower ends of the members 166 and 167 are provided with cam blocks 172 and 173, respectively (Fig. 15) which are elongated in the direction of movement of the cartons to act as top guides therefor. As best seen in Fig. 21, the rearmost ends of the cam blocks 172 and 173 are provided with downwardly and rearwardly inclined cam surfaces 177 and 178, respectively, which stagger the cartons at the lower end of the magazine and move the lowermost carton rearwardly against the rear wall of the magazine 140 to insure proper seating thereof against the shoulder 139 on the block 133. The lower surfaces of the blocks 172 and 173 are adjusted by rotation of the adjusting screws 170 and 171 to a height above the plates 158 and 159 approximately equal to a carton thickness whereby only one carton may issue at a time from the magazine 140.

*Movable carton-feed gate mechanism*

The movable gate mechanism generally indicated at 180 is best illustrated in Figs. 11, 12, 13 and 15 and comprises a hub 181 (Fig. 12) rotatably mounted on a sleeve 182 which in turn is rotatably mounted on a transverse shaft 183. The shaft 183 extends transversely above the conveyor 130 and has its opposite ends slidably received within longitudinal slots 186 and 187 (Fig. 11) formed in parallel bars 188 and 189, respectively, which are mounted on the frame of the machine, one adjacent each side of the conveyor E, forwardly of the magazine 140. The bar 188 is secured by a plurality of studs 191 to a vertical plate 192 projecting upwardly from a horizontal plate 193 secured by bolts 194 to a gear casing 195 which is mounted on the frame structure. The bar 189 (Fig. 13) is fixed to a bracket which, in turn, is connected to the frame of the machine. An arm 196 extends rearwardly from the hub 181 in the manner illustrated in Fig. 12, and terminates in a crosshead 197 (Fig. 15). As best seen in Fig. 13, two identical but oppositely disposed angle brackets 199 and 200 are adjustably secured to the opposite ends of the crosshead 197. The bracket 199 is connected to the right end of the crosshead 197 by machine screws 201 extending through suitable slots in the bracket. A stop member 202 is connected to the bracket 199 by machine screws 204. The downwardly depending portion of the stop member 202 is bent rearwardly in the manner indicated at 206 in Fig. 15, to lie on the bottom plate 159 of the magazine in a position to contact the foremost edge of the lowermost carton in the magazine 140 and prevent forward movement thereof until the movable gate 180 is raised in a manner hereinafter described. The second angle bracket 200 is connected to the left end of the crosshead 197 by machine screws 207 and a second stop member 209, identical to the stop member 202, is connected to the bracket 200 by machine screws 208.

A second arm 203 (Fig. 12) is formed integral with the hub 181 and extends forwardly therefrom and has a portion disposed beneath a cam 210 fixed to a sleeve 211 rotatably mounted on a fixed transverse shaft 212 extending between the bars 188 and 189 parallel to and forwardly of the shaft 183. When the mechanism is operated and the sleeve 211 is rotated, the cam 210 rocks the gate mechanism 180 clockwise (Fig. 12) about the sleeve 182 to raise the stop members 202 and 209 at the exact moment that the rear edge of the lowermost carton C in the magazine 140 is contacted by the surface 139 on the block 133 of the carton conveyor E. Thus it is seen that the movable gate member 180 prevents any forward movement of the carton C from the magazine 140 until it is properly seated against the surface 139 of the block 133. The movable gate mechanism returns to its counterclockwise position by gravity after the carton C has passed therebeneath.

The opposite ends of the shaft 183 have mounted thereon collars 213 and 213a, respectively. The collar 213 has rigidly attached thereto a rearwardly extending stud 214 which extends through a suitable aperture formed in a block 215 connected to the rearmost end of the bar 188, and a pair of nuts 216 and 217 are threaded on the stud 214 one on either side of the block 215 to adjust the position of the shaft 183 relative to the bar 188. Similarly, a stud 218 is fixed to the collar 213a and extends rearwardly therefrom through a suitable aperture in a block 219 fixed to the rearmost end of the bar 189. A similar pair of nuts 220 and 221 are threaded onto the stud 218 one on either side of the block 219 to adjust the position of the shaft 183 relative to the bar 189.

*Carton spreading mechanism*

As the carton is removed from the magazine 140 by one of the blocks 133 on the carton conveyor E, the outermost edges of the flaps 145 and 146 are contacted by the under surfaces of a pair of downwardly and forwardly inclined cam guides 222 and 223, respectively (Figs. 15 and 37) and are cammed downwardly thereby. The guides 222 and 223 are mounted in any suitable manner on the frame of the machine adjacent the path of the conveyor E and are spaced outwardly from the center line thereof a distance sufficient to catch the outermost edges of the flaps 145 and 146 and the flaps 149 and 150, respectively, of the carton C and at the same time, permit the flaps 151 and 152 thereof to pass therebetween without being engaged thereby. A pair of horizontal splitting blades 224 and 225 are adjustably mounted adjacent the left and right sides of the conveyor E, respectively, forwardly of and above the guides 222 and 223, by studs 226 and 227 extending through suitable laterally extending slots 228 and 229 in the splitting blades 224 and 225, respectively. The splitting blades have their innermost edges beveled downwardly and inwardly and extend inwardly toward the center line of the conveyor E a distance sufficient to underlie, and cam upwardly, the flaps 151 and 152 hingedly connected to the top panel 141 of the carton C.

An upwardly projecting cam 230 (Fig. 15) is formed integrally with and extends upwardly from the inner edge of the splitting blade 225 adjacent the foremost portion thereof and is adapted to bend the flap 152 upwardly along the crease line separating said flap from the top panel 141 of the carton. A vertically extending disc 231 is rotatably mounted on the sleeve 182 adjacent the right end thereof as shown in Fig. 11. The peripheral edge of said disc 231 is adapted to press downwardly against the top panel 141 of the carton C adjacent the crease line separating the panel from the flap 152 and thereby cooperates with the cam 230 in folding the flap 152 upwardly along said crease line. As the carton C moves beyond the cam 230, the flap 152 again swings downwardly until it engages a rod 232 extending parallel to the conveyor 130, and is held thereby in an upwardly bent relation until the erection of the carton has been completed.

*Carton erecting blade*

The initial opening of the carton is effected by a carton erecting blade 233 mounted on the left side of the conveyor 130 at a point adjacent the foremost end of the splitting blade 224. Referring now specifically to Figs. 13, 14 and 15, a pair of plates 234 and 235 are rigidly connected to the frame of the machine through a gear casing 195 and an intermediate structure hereinbelow described. The plates 234 and 235 extend rearwardly from the gear casing 195 and provide a stationary support for the actuating mechanism of the erecting blade. A sleeve 238 (Fig. 13) is fixed to the plates 234 and 235 and rotatably supports, by means of bearings 240 and 241, a vertically extending shaft 242 therewithin. A rotating gear housing 243 is held on the lower end of the shaft 242 by a snap ring 244 and is connected to said shaft for rotation therewith by a set screw 245. A hub 246 surrounds the shaft 242 and is adjustably connected to the stationary sleeve 238 by a set screw 247. A stationary sun gear 248 is fixed to the lower end of the hub 246 by a pair of studs 249, said gear being received within a suitable opening 250 centrally located in the upper portion of the gear housing 243, and being provided with a suitable central opening 251 through which the shaft 242 extends. An idler gear 252 (Fig. 14) is rotatably mounted on a stub shaft 253 fixed within the gear housing 243 and meshes with the stationary sun gear 248 and with a planet gear 254 fixed to a shaft 255 rotatably mounted in suitable upper and lower bearing bosses 256 and 257, respectively, provided on the gear housing 243. The lower end of the shaft 255 projects downwardly below the lower surface of the housing 243 and is secured to a block 258 by a suitable set screw 259. The block 258 is provided with a horizontally extending bore 260 which rotatably receives a shaft 261 which, in turn, is welded to the carton erecting blade 233. A main drive sprocket 262 is fixed to the upper end of the shaft 242 and is driven by a suitable drive chain 263 in a manner hereinbelow described. With this arrangement, when the shaft 242 is rotated the housing 243 and the gears 252 and 254 will be carried bodily around the stationary gear 248. The gears 248, 252 and 254 are so designed that, when the housing 243 is rotated around the fixed gear 248, the block 258 will also be carried in a circular path but will always remain in a position wherein the carton erecting blade 233 projects toward the conveyor E.

As the blade is carried in a rotary path around shaft 242, it is swung from a horizontal to a vertical position, and returned to the horizontal position by a cam ring 264 mounted on the outer surface of the lower bearing boss 257 and adjustably secured with relation thereto by a stud 265 extending through a suitable slot 266 (Fig. 20) formed in said sleeve and threadedly received in a suitably threaded hole in the lower surface of the gear housing 243. A downwardly depending cam projection 267 is formed on the sleeve 264. The leading edge 267a of the projection 267 successively engages two cam followers 268 and 269 fixed to the shaft 261, one follower adjacent each end of the block 258, whereby rotation of the cam ring 264 relative to the shaft 255 will cause the carton erecting blade 233 to oscillate between its horizontally disposed position illustrated in Fig. 15, and its vertically disposed position illustrated in Figs. 13 and 20. The action of the carton erecting blade as the block 258 orbits about the axis of the shaft 242 is illustrated in the series of schematic views Figs. 16 through 19. Fig. 16 illustrates schematically the position of the carton erecting blade 233 and the cam followers 268 and 269 relative to the cam 267 at the initial entry of the blade 233 into the carton C. The cam 267 is in engagement with the follower 225 and is holding the blade 233 in its horizontal position. As the elements progress from the positions shown in Fig. 16 to those shown in Fig. 17, the leading edge 267a of the cam 267 contacts the cam follower 268 and rotates the blade 233 to its vertical position to initially open the carton in the manner illustrated in Fig. 39. Fig. 18 illustrates the blade 233 being withdrawn from the carton at which time the blade is still in its vertical position. Fig. 19 shows the blade 233 fully retracted from the carton and the leading edge 267a of the cam 267 has just contacted the follower 269 to return the blade to its horizontal position in preparation for its entry into the succeeding carton.

Carton erecting lugs

The carton erecting blade 233 is assisted in the erecting of each carton by pairs of transversely aligned lugs 271 (Figs. 11 and 12) carried on endless chains 272 and 273, each of which is trained over a sprocket 274 that is keyed to the rotatable sleeve 182 and over a sprocket 275 keyed to the rotatable sleeve 211. The lower reaches of the chains 272 and 273 are located at an elevation slightly above the upper edges of the blocks 133 on the carton conveyor E, and the lugs 271 are adapted to project downwardly below the plane of the upper edges of the blocks 133 and to contact the rearmost edge of the carton C, in the manner illustrated in Fig. 39, beyond the lateral ends of the blocks 133 and aid the carton erecting blade 233 in the erection of the carton C by moving the top panel 141 of the carton forwardly relative to the bottom panel 142, the forward end of which abuts the rear face 136 of the preceding block 133. The chains 272 and 273 are driven at a greater linear speed than the speed of the carton conveyor E by a drive chain 277 (Fig. 11) meshing with a sprocket 278 fixed to the sleeve 211 adjacent the right end thereof and driven in a manner hereinbelow described.

A pair of resilient fingers 280 are fixed to the sleeve 211 inwardly of the planes of the chains 272 and 273 and are adapted to strike the upper surface of the top panel 141 of the open carton and force the carton downwardly into seated relation with the upper surface of the conveyor E, with the front and rear panels 143 and 144 of the carton embraced between the vertical faces 136 and 135, respectively, of two adjacent blocks 133 on said conveyor and with the end flaps extending laterally beyond the right and left sides of the conveyor E in the manner illustrated schematically in Fig. 40.

Left side flap tucking mechanism

As best seen in Fig. 12 a flap tucking cam 281 is fixed to a vertical shaft 282 rotatably supported by suitable bearings (not shown) adjacent the left side of the conveyor E, forwardly of the location of the erecting mechanism D described above. A drive sprocket 283 (Fig. 12) is fixed to the upper end of the shaft 282 and is connected by a drive chain 284 (Fig. 11) to a suitable sprocket 285 fixed to a vertically extending drive shaft 286. The drive shaft 286 is provided with a second drive sprocket 287 which meshes with and drives the chain 263 in the manner illustrated in Fig. 11, to drive the erecting blade mechanism in the manner previously described. As best seen in Fig. 11, the housing 195 which encloses the shaft 286, supports the plates 234 and 235 previously described.

Returning now to Figs. 12 and 40, a cam guide plate 290 extends parallel with the left edge of the carton conveyor 130 and is provided with a rearwardly extending finger 291 which extends below the plane of the tucking cam 281 and is adapted to be struck by, and to fold inwardly, the flap 145 at the left end of the forward panel 143 of the carton C as the carton is moved therepast by the movement of the carton conveyor E. The upper edge of the guide plate 290 is spaced from the lower surface of a guide bar 299 a distance sufficient to permit the flap 151 to extend therebetween. The flap 147 at the left end of the rear panel 144 is received within an indentation 292 formed in the periphery of the cylindrical tucking cam 281 and is, in turn, folded inwardly by a finger 293 defining one edge of the indentation 292, since the tucking cam 281 is rotated with a peripheral velocity greater than the velocity of the carton conveyor 130. The diameter of the tucking cam 281 is so chosen, and the rotational velocity is so timed with relation to the movement of the conveyor E, that the flaps 147 connected to the rear panel 144 of each of the consecutive cartons, are each in turn received within the indentation 292 and folded inwardly by the finger 293 to be received adjacent the inner surface of the guide plate 290.

Top panel bowing mechanism

As shown in Figs. 3B, 22, 23, and 25, the cam guide plate 290 and the bar 299 are supported by a pair of brackets 304 and 305 suitably connected to the left side of the frame of the machine. A deflector bar 306 is connected to the outer side of the bar 299 and extends therebelow in the manner indicated in Fig. 23 to bend the flap 151 of the carton downwardly over the upper edge of the guide plate 290 to cause the upper panel 141 and the flap 152 of the carton C to bow upwardly and facilitate the insertion of a pie therein. The rearmost end of the bar 306 is chamfered in the manner indicated at 307 to guide the flap downwardly beneath the lower edge of the bar as the carton is moved therepast.

No-pie-no-carton interlock

Means are provided to prevent the feed and erection of a carton from the magazine 140 into the space on the carton conveyor E corresponding to a space on the pie conveyor A in which there is no pie. This mechanism is best illustrated in Figs. 11 and 21 and comprises an arm 310 pivotally mounted for rotational movement about a vertical shaft 311 suitably mounted adjacent the right edge of the pie conveyor A. A compression spring 312 is interposed between the foremost end of the arm 310 and the side plate of the machine and urges the arm 310 to rotate in a clockwise direction as viewed in Fig. 11 so that the rearmost end extends inwardly above the pie conveyor A into the path of the pies being conveyed thereon. The rearmost end 313 of the arm 310 is rounded so that the pies moving on the conveyor A will move the arm 310 counterclockwise about its pivot shaft 311. The inner side of the arm 310 is provided with an elongated straight portion 314 which is adapted to remain in contact with the pies being conveyed on the conveyor A, whereby as long as there are pies in each successive pie position on the conveyor A, the arm 310 will remain in its outward position and is only permitted to swing inwardly adjacent a pie position at which there is no pie. A bracket 315 is connected to the foremost end of the arm 310 and adjustably carries a stud 316 which is adapted to strike and actuate a microswitch 317 when the arm is rotated in a counterclockwise direction by a pie on the conveyor A. The microswitch 317 is a normally closed switch but is moved to and is held in its open position by the stud 316 when arm 310 is in contact with a pie. Thus, it can be seen that the microswitch 317 is closed and permits current to pass only when there is a gap in the procession of pies on the conveyor A.

Turning now specifically to Fig. 21, the microswitch 317, previously described, is connected in the circuit of a solenoid 318 mounted above the carton conveyor E, rearwardly of the magazine of the carton erecting mechanism, by an inverted U-shaped bracket 319 fixed to the frame of the machine. A plunger 320 of the solenoid 318 is pivotally connected by a pin 321 to an inverted U-shaped yoke 322. The lower ends of the yoke 322 are pivotally connected by pins 323 and 324 to the rearmost ends of a pair of arms 325 and 326, respectively, the forward ends of which extend forwardly beneath the magazine 140 of the carton erecting mechanism D. The forward ends of the arms 325 and 326 are pivotally mounted on stub shafts 327 and 328, respectively, fixed to the frame of the machine. Fixed to the arms 325 and 326, intermediate the ends thereof, are a pair of lifting members 329 and 330 adjacent the rear end of the carton magazine 140 and extending through suitable slots 331 and 332 formed in the rear edges of the bottom plates 158 and 159 of the magazine 140.

When the microswitch 317 is held in its open position by the arm 310 being moved outwardly by the pies on the conveyor A in the manner indicated in Fig. 21, the solenoid 318 is de-energized and the upper surfaces of the lifting members 329 and 330 are coplanar with or below the upper surfaces of the bottom plates 158 and 159 of the magazine 140, and the cartons are fed successively therefrom in the manner described above. When a position on the pie conveyor A at which there is no pie reaches the arm 310, the arm is permitted to swing inwardly thus permitting the contacts in the microswitch 317 to close and energize the solenoid 318 to raise the yoke 322 and rotate the arms 325 and 326 about the stub shafts 327 and 328. The lifting members 329 and 330 lift the bottommost carton in the magazine 140 above the plane of the uppermost edges of the blocks 133 on the carton conveyor E, thereby preventing the feed of a carton in the position on the carton conveyor E corresponding to the position on the pie conveyor A at which there is no pie.

Guides are provided for the various end flaps of the cartons as they leave the carton erecting station as follows. As best seen in Figs. 11 and 12, the top guide bar 299 is mounted adjacent the left side of the conveyor E and overlies the flap 151 at the left end of the top panel 141 of the carton. A deflector bar 300 is pivotally connected at 298 to the rearmost end of the guide bar 299 and extends rearwardly and upwardly therefrom to engage the flap 151 as the carton passes beneath the pusher fingers 280 and to guide the flap downwardly beneath the under surface of the top guide bar 299. As best seen in Fig. 12, the bar 300 may be rotated upwardly about its pivotal connection with the bar 299 and a spring 301 normally urges the deflector bar 300 to its lowermost position.

As best seen in Fig. 40, a bottom guide bar 302 is located adjacent the right side of the carton conveyor E and is provided at its rearmost end with an upwardly turned finger 303 whereby as the cartons leave the position adjacent the pusher finger 280, the bottom flap 150 at the right end of the carton will be deflected beneath the guide bar 302.

*Pie inserting mechanism*

As can be seen in Fig. 3B, there is an erected carton C, shown in phantom lines, on the carton conveyor E opposite each of the pies on the pie conveyor A. The two conveyors E and A travel in synchronism with each other at the same speed. As best illustrated in Figs. 24 and 25, an intermediate transfer conveyor 340 is located between the pie conveyor A and the carton conveyor E. The transfer conveyor 340 is similar in construction to the pie conveyor A and is trained about a pair of sprocket like drums 341 and 342 in the manner indicated schematically in Fig. 34 and is driven in synchronism with the pie conveyor A. The left edge of the pie conveyor A is immediately adjacent the right edge of the conveyor 340, and the left edge of the conveyor 340 is immediately adjacent the right edge of the guide plate 302 previously described. A dead plate 339, coplanar with the upper surfaces of the conveyors E and 340, and the guide plate 302, bridges the space between said plate 302 and the conveyor E.

A pie transfer chain 343 is trained around a sprocket 344 fixed to a vertical shaft 345 mounted adjacent the right side of the pie conveyor A, and around a second sprocket 346 mounted on a vertical shaft 347 adjacent the forward end of the transfer conveyor 340. The transfer chain 343 extends diagonally above the upper surfaces of the pie conveyor A and the transfer conveyor 340. The transfer chain 343 is driven in timed relation with the conveyors A, E and 340 in a manner hereinbelow described, whereby as the pies are moved forwardly by the conveyors A and 340, they are moved laterally to the left by the transfer chain 343 and into the cartons C on the conveyor E. Fixed to the shaft 347, below the sprocket 346, is a resilient finger 350 made of rubber or similar material. The finger 350 is at approximately the same elevation as the flights on the conveyors A and 340. The finger 350 is so positioned on the shaft 347, the rotation of which is timed to the movement of the conveyors A, 340 and E, that the finger 350, rotating clockwise, contacts each pie and pushes the pie completely into the carton C against the side plate 290 of the frame which is disposed across the partially open left end of the carton in the manner illustrated in Fig. 41.

*Right side flap tucking mechanism*

Immediately forward of the finger 350 (Fig. 25), the flap 146 on the right end of the forward panel 143 of the carton C contacts a rearwardly extending finger 351 on a vertical plate 352 of the carton closing and locking mechanism G and is folded inwardly thereby in the manner illustrated in Figs. 25 and 42. A second flap tucking cam 353 similar to the cam 281, previously described, is fixed on a shaft 354 for rotation therewith at a position adjacent the finger 351. As can best be seen in Fig. 25, the tucking cam 353 is provided with an indentation 355 defining a tucking finger 356 which contacts the flaps 148 on the rear panel 144 of the cartons C and tucks said flaps inwardly in the same manner as described above with respect to the flaps 147.

*Flap closing and locking mechanism*

As best seen in Fig. 3B the flap closing and locking mechanism G comprises two flap closing assemblies 370 and 371, respectively, mounted adjacent the opposite sides of the carton conveyor E. Since the two flap closing and locking mechanisms are mirror images of each other, acting in exactly the same manner, but on opposite ends of the carton, only the mechanism 371 adjacent the right side of the carton conveyor E will be described in detail.

Referring now specifically to Figs. 26 and 28 through 33, the mechanism 371 comprises a U-shaped bracket 372 (Fig. 28) fixed to the frame of the machine with the open face thereof facing inwardly toward the center line of the conveyor E. The side plate 352, previously described, is mounted on the bracket 372 by a pair of studs 373 in the manner indicated in Figs. 26 and 28 whereby the plate 352 holds the front and rear end flaps 146 and 148 in their inwardly folded position and provides upper and lower edges about which the upper and lower flaps 152 and 150, respectively, may be folded. The plate 352 is beveled along its entire upper and lower edges as indicated at 374 and 375 to provide knife edges about which such folding is accomplished.

A bottom flap folding cam 376 is fixed to the bracket 372 and extends forwardly therefrom. As best seen in Fig. 26, the folding cam 376 is initially merely a horizontal plate having a downwardly flared rearmost end where it is attached to the bracket 372, but is provided with a folding wing 377 which is progressively bent from an initially substantially horizontal position at its rearmost edge to a substantially vertical position at its foremost edge, whereby the bottom flap 150 is bent upwardly as the carton C progresses past the plate 376 in the manner indicated in Figs. 29 and 30.

An upper flap folding cam 378 having an upwardly flared rearmost end is attached to the upper leg of the bracket 372 and extends forwardly therefrom. The plate 378 is provided with a folding wing 379, the rearmost edge of which is spaced forwardly of the foremost edge of the wing 377 on the plate 376. The wing 379 similarly progresses from a substantially horizontal position at its rearmost edge to a depending vertical position therebeyond, whereby the upper flap 152 is bent downwardly as the carton progresses to a position overlying the flap 150 in the manner illustrated in Fig. 30.

A plate 380 is fixed to the outer surface of the guide plate 352 and is provided with an outwardly projecting cam portion 381 adjacent to and immediately below the slits 156 formed in the bottom flap 150 of the carton C. The bottom flap folding cam plate 376 is turned outwardly adjacent the cam projection 381 in the manner indicated at 382 in Fig. 31, whereby as the carton progresses past the cam projection 381, the upper portion of the bottom flap 150 is held inwardly by the overlapping flap 152 and the wing 379, while the lower portion is bowed outwardly in the area containing the slits 156 causing the slits to open. The upper flap folding cam wing 379 maintains the upper flap 152 and the tabs 154 extending therefrom in close contact with the outer surface of the lower flap 150, whereby as the carton progresses beyond the end of the cam projection 381 and the flaps are returned to their planar position by the folding cams 378 and 376 and the tabs 154 are projected through the slits 156 in the manner illustrated in Fig. 32.

The carton now progresses beyond the foremost end of the plate 352 and between a pair of setting cam plates 390 and 391 which are mounted on the frame of the machine adjacent the left and right sides, respectively, of the carton conveyor E in the manner illustrated in Figs. 33 and 44. The cam plate 390 is provided with an inwardly facing U-shaped opening 392 of the exact size as the outside dimension of the left ends of the cartons C. The vertical edge portion of the opening 392 is tapered forwardly and inwardly in the manner indicated at 393, the upper edge portion is tapered forwardly and downwardly in the manner indicated at 394 and the bottom edge portion is tapered forwardly and upwardly in the manner indicated at 395 whereby, as the carton progresses through the opening 392, the end of the carton is squared and the flaps are folded firmly in the locked position.

It will be appreciated from the examination of Figs. 28 through 33 that the exact operations thus described are simultaneously performed on both ends of the carton C, and that the carton issues from the cam members 390 and 391 in its completely closed and locked relation with the pie P located therewithin.

*Drive mechanism*

As best illustrated in Fig. 34, the drive mechanism for the various assemblies described above comprises a motor and a variable ratio gear reducing unit 400 having an output shaft 401 to which there is affixed two drive sprockets 402 and 403. The sprocket 402 is connected by a chain 404 to a sprocket 405 on one end of a line shaft 406. The other end of the line shaft 406 is connected through a bevel gear set indicated by the box 407 to a transverse shaft 408 having a sprocket 409 fixed thereto. The sprocket 409 through a drive chain 410 drives the pie making machine (not shown) thus insuring that the pie making machine is operated in timed relation with the pie cartoning machine described herein.

The sprocket 403 is connected by a chain 411 to a sprocket 412 on a line shaft 413. A bevel gear 414 fixed to the shaft 413 meshes with a bevel gear 415 on a transverse shaft 416 and a bevel gear 417 on the vertical shaft 286 (previously described). A sprocket 418 on the shaft 416 drives the chain 277 of the carton erecting mechanism (previously described). A second sprocket 419 on the shaft 416 drives the drive chain 65 of the tamping and perforating mechanism B.

A bevel gear 420 on one end of a line shaft 421 meshes with and is driven by the bevel gear 415. The line shaft 421 drives a transverse shaft 424 through a matched bevel gear set 422, 423. A sprocket 425 on the shaft 424 is connected by a chain 426 to a sprocket 427 fixed to the drum 132 of the carton conveyor E. A bevel gear 428 on the shaft 424 drives a bevel gear 429 on a vertical drive shaft 430. Two sprockets 431 and 432 are fixed to the upper end of the shaft 430. The sprocket 431 through a chain 435 drives a sprocket 436 fixed to the shaft 354 of the right side flap tucking cam 353. The sprocket 432, through a chain 433 and a sprocket 434 drives the shaft 347 and the sprocket 346 thereon about which one end of the pie transfer chain 343 is trained. A sprocket 437 fixed to the shaft 424, through a chain drive 438, drives a sprocket 439 fixed to a shaft 440 on which the drum 49 of the pie conveyor A, and the drum 342 of the transfer conveyor 340 are fixed.

The pie conveyor A turns the drum 48 about which it is trained and which in turn is fixedly mounted on a shaft 441. The drum 46 of the auxiliary conveyor 52 is rotatably mounted on shaft 441. A sprocket 442 is fixed to one end of the shaft 441 and is connected by a chain 443 with a sprocket 444 on a shaft 445 to which the drum 47 of the conveyor 52 is fixed. The gear ratio between the sprockets 442 and 444 is a two to one step up ratio whereby the conveyor 52 moves at twice the linear speed of the pie conveyor A.

*Operation*

In the operation of the device, the pies P issue from the pie making machine (not shown) two abreast, and are picked up simultaneously by alternate flights 51 and 53 on the conveyor belts 50 and 52, respectively. As explained above, the pies on the conveyor belt 52 are advanced relative to the companion pies on the belt 50 and are interposed therebetween by the inclined edge 57 of the guide plate 55 to form a single line of pies on the conveyor belt 50 of the main pie conveyor A. The pies on the pie conveyor A are conducted in single file past the pie tamping and perforating mechanism B at which point the orbiting tamping and perforating heads 64 tamp the upper crust down to eliminate any upwardly extending projections, and perforate the upper crust to permit the escape of steam when the pies are ultimately cooked.

The carton erecting mechanism D erects cartons C and deposits them on the carton conveyor E in opposition to the pies P on the pie conveyor A in the manner described above. The pies P and the cartons C are moved forwardly along parallel paths at the same speed by their respective conveyors A and E until the pies P contact the transfer chain 343. The transfer chain 343 moves the pies P laterally into the cartons C on the carton conveyor E. The conveyor E then carries the cartons C between the opposed flap closing and locking mechanisms G and the carton issues therefrom with the pie locked therein.

From the foregoing description it may be seen that the present invention defines a novel, efficient, high speed, automatic machine for inserting articles into cartons and for subsequently closing and locking the cartons.

While a preferred embodiment of the invention has been shown and described herein with reference to cartoning pies, it is obvious that various changes may be made in its construction and that various other articles may be inserted into cartons thereby, without departing from the spirit of the invention as defined in the appended claims.

Having thus described my invention, what I claim and desire to secure by Letters Patent is:

1. An article handling mechanism comprising a first conveyor, means for driving said first conveyor at a fixed speed, a second conveyor parallel to said first conveyor, means for driving said second conveyor at twice the linear speed of said first conveyor, and means spaced a predetermined distance forwardly from the pick-up end of said conveyors for moving articles laterally from said second conveyor to said first conveyor, whereby articles picked up by said second conveyor simultaneously and in side-by-side relation with articles picked up by said first conveyor will be advanced forwardly relative to said articles on said first conveyor and then moved laterally between successive articles on said first conveyor.

2. An article handling mechanism comprising a first conveyor, means for driving said first conveyor at a predetermined speed, a second conveyor parallel to said first conveyor, means for driving said second conveyor at twice the linear speed of said first conveyor, and an inclined guide spaced a predetermined distance forwardly from the pick-up end of said conveyors and extending across said second conveyor forwardly and toward said first conveyor, whereby articles picked up by said second conveyor simultaneously and in side-by-side relation with articles picked up by said first conveyor will be advanced forwardly relative to said articles on said first conveyor and then moved laterally between successive articles on said first conveyor.

3. An article handling mechanism comprising a first conveyor, means for driving said first conveyor at a predetermined speed, spaced flights on said conveyor, a second conveyor parallel to said first conveyor, flights on said second conveyor, the flights on said second conveyor being spaced from each other a distance equal to twice the distance between flights on said first conveyor, means for driving said second conveyor at twice the linear speed of said first conveyor, and an inclined guide disposed a predetermined distance forwardly from the pick-up ends of said conveyors and extending across said second conveyor forwardly and toward said first conveyor, whereby articles picked up by said second conveyor simultaneously and in side-by-side relation with articles picked up by said first conveyor will be advanced forwardly relative to said articles on said first conveyor and then moved laterally between successive articles on said first conveyor.

4. An article handling mechanism comprising a first conveyor, means for driving said first conveyor at a predetermined linear speed, a second conveyor parallel to said first conveyor, means for driving said second conveyor at a linear speed greater than that of said first conveyor, and means spaced a predetermined distance forwardly from the receiving ends of said conveyors for moving articles laterally from said second conveyor to said first conveyor, whereby articles received by said second conveyor simultaneously and in side-by-side relation with articles received by said first conveyor will be advanced forwardly relative to said articles on said first conveyor and then moved laterally between successive articles on said first conveyor.

References Cited in the file of this patent
UNITED STATES PATENTS

| | | |
|---|---|---|
| 1,337,404 | Jones | Apr. 20, 1920 |
| 1,628,803 | Pinter | May 17, 1927 |
| 1,784,571 | Bergstein | Dec. 9, 1930 |
| 1,868,873 | Bergstein | July 26, 1932 |
| 1,873,059 | Smith et al. | Aug. 23, 1932 |
| 1,935,269 | Jones | Nov. 14, 1933 |
| 2,030,598 | Liles | Feb. 11, 1936 |
| 2,108,522 | Bergmann | Feb. 15, 1938 |
| 2,280,324 | Tracy | Apr. 21, 1942 |
| 2,315,670 | Tascher et al. | Apr. 6, 1943 |
| 2,345,045 | Harriss | Mar. 28, 1944 |
| 2,573,944 | Anderson | Nov. 6, 1951 |
| 2,639,916 | Anness | May 26, 1953 |
| 2,649,676 | Kerr | Aug. 25, 1953 |
| 2,651,442 | Malhiot | Sept. 8, 1953 |
| 2,685,158 | Von Haase | Aug. 3, 1954 |